(12) United States Patent
Arai et al.

(10) Patent No.: US 8,174,939 B2
(45) Date of Patent: May 8, 2012

(54) OPTICAL HEAD AND OPTICAL DISC DEVICE

(75) Inventors: Akihiro Arai, Kyoto (JP); Yoshiaki Komma, Osaka (JP)

(73) Assignee: Panasonic Corporation, Osaka (JP)

( * ) Notice: Subject to any disclaimer, the term of this patent is extended or adjusted under 35 U.S.C. 154(b) by 1146 days.

(21) Appl. No.: 11/898,035

(22) Filed: Sep. 7, 2007

(65) Prior Publication Data

US 2008/0062825 A1    Mar. 13, 2008

(30) Foreign Application Priority Data

Sep. 7, 2006    (JP) ................................ 2006-243361

(51) Int. Cl.
*G11B 7/00*    (2006.01)
*G11B 7/135*    (2006.01)

(52) U.S. Cl. ............ 369/44.14; 369/112.03; 369/109.01

(58) Field of Classification Search ............... 369/44.14, 369/109.01, 109.02, 112.03, 112.04, 112.12, 369/275.1, 115, 206, 205, 183, 207, 208, 369/270.1, 152, 30.98, 196, 235, 44.25, 44.26, 369/44.29, 44.34, 44.35; 359/204.5, 207.7, 359/211.6, 217.4, 558, 563, 101, 568; 720/695, 720/696, 699; 360/78.05, 78.13, 99.03, 99.07, 360/271.7
See application file for complete search history.

(56) References Cited

U.S. PATENT DOCUMENTS

| | | | |
|---|---|---|---|
| 5,886,964 A | 3/1999 | Fujita | |
| 6,276,225 B1 | 8/2001 | Takeda et al. | |
| 6,282,164 B1 * | 8/2001 | Katayama | 369/112.12 |
| 6,493,296 B1 * | 12/2002 | Fukumoto et al. | 369/44.32 |
| 2004/0081064 A1 | 4/2004 | Ohnishi et al. | |
| 2005/0276206 A1 * | 12/2005 | Katayama | 369/112.03 |
| 2006/0077784 A1 * | 4/2006 | Kanaya et al. | 369/44.14 |
| 2006/0158996 A1 * | 7/2006 | Kim | 369/112.03 |
| 2006/0158997 A1 * | 7/2006 | Kim et al. | 369/112.03 |
| 2007/0081431 A1 * | 4/2007 | Watanabe et al. | 369/44.12 |
| 2007/0133374 A1 | 6/2007 | Arai | |
| 2009/0022032 A1 * | 1/2009 | Kawasaki et al. | 369/109.02 |

FOREIGN PATENT DOCUMENTS

| | | |
|---|---|---|
| JP | 7-98431 | 4/1995 |
| JP | 7-272303 | 10/1995 |
| JP | 9-81942 | 3/1997 |
| JP | 2000-145915 | 5/2000 |
| JP | 2004-63703 | 2/2004 |
| JP | 2004-145915 | 5/2004 |

(Continued)

*Primary Examiner* — Joseph Feild
*Assistant Examiner* — Aneeta Yodichkas
(74) *Attorney, Agent, or Firm* — Wenderoth, Lind & Ponack, L.L.P.

(57) ABSTRACT

An optical head includes a diffraction element capable of improving the quality of a TE signal by a DPP method even if light amounts of two sub-spots are unbalanced for optical discs having different groove pitches. In a three-beam optical head, a diffraction element is divided in a radial direction of an optical disc into a first area, a second area and a third area, wherein the second area is further divided into a fourth area and a fifth area. The periodic structure of the first area is displaced from that of the fourth area by a ¼ period, the periodic structure of the third area is displaced from that of the first area by a ½ period, and the periodic structure of the fifth area is displaced from that of the third area by a ¼ period and from that of the fourth area by a ½ period.

7 Claims, 17 Drawing Sheets

FOREIGN PATENT DOCUMENTS

| | | |
|---|---|---|
| JP | 2006-4499 | 1/2006 |
| JP | 2007-122779 | 5/2007 |
| JP | 2007-141425 | 6/2007 |
| WO | 2004/097815 | 11/2004 |

\* cited by examiner

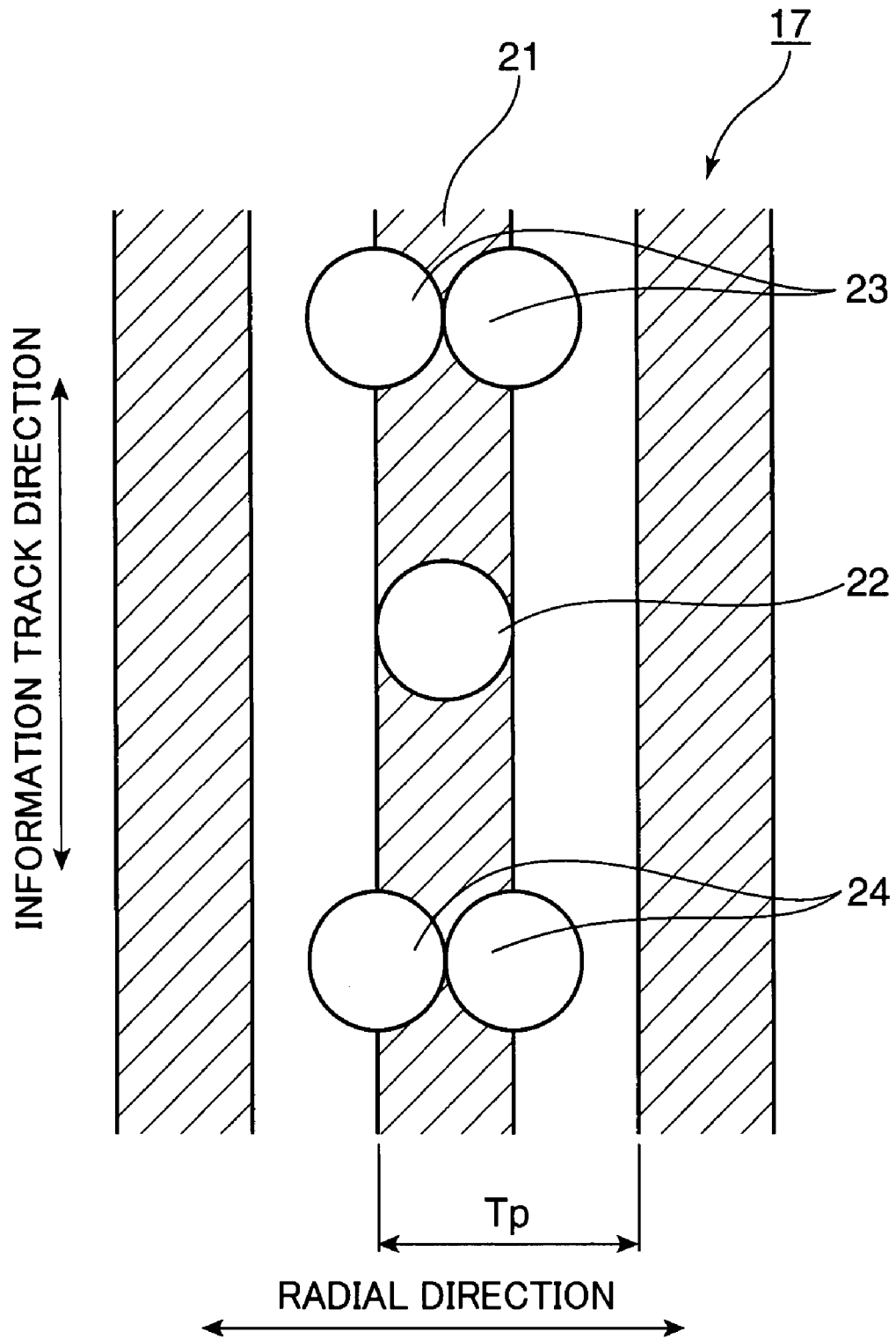

OVERLAP OF ±1$^{ST}$-ORDER DIFFRACTED LIGHTS AND 0$^{TH}$-ORDER DIFFRACTED LIGHT

OVERLAP OF ±1$^{ST}$-ORDER DIFFRACTED LIGHTS
AND 0$^{TH}$-ORDER DIFFRACTED LIGHT

OPTICAL HEAD AND OPTICAL DISC DEVICE

BACKGROUND OF THE INVENTION

1. Field of the Invention

The present invention relates to an optical head used upon recording and/or reproducing an information signal in and/or from an information recording medium such as an optical disc, and an optical disc device equipped with such an optical head.

2. Description of the Background Art

So-called three-beam optical heads have been conventionally known. In such a conventional optical head, a laser light emitted from a laser light source is split by a diffraction element into a $0^{th}$-order diffracted light (hereinafter, "main beam") that is not diffracted and two $\pm 1^{st}$-order diffracted lights (hereinafter, "two sub-beams") that are diffracted and polarized, and the main beam and two sub-beams are focused on an optical disc by an objective lens, thereby forming three spots including one main spot and two sub-spots. The two sub-spots are arranged at positions distanced from the main spot in inner and outer radial directions of the optical disc by half the groove pitch. The main beam and two sub-beams reflected by the optical disc are respectively introduced to three four-divided photodetectors (two-divided in radial direction and two-divided in track direction) disposed at different positions on a light receiving element.

A tracking error signal (hereinafter, "TE signal") by a differential push-pull (DPP) method can be obtained by subtracting a signal obtained by a sum signal of a push-pull signal detected by the four-divided photodetector having received one sub-beam (hereinafter, "signal PPS1") and a push-pull signal detected by the four-divided photodetector having received the other sub-beam (hereinafter, "signal PPS2") by a specified gain from a push-pull signal detected by the four-divided photodetector having received main beam (hereinafter, "signal PPM").

Offset components are generated in the above signal PPS1, signal PPS2 and signal PPM resulting from the displacement of the objective lens to follow the movement of an information track caused by the center-deviation of the optical disc. The offset components contained in the signal PPS1, signal PPS2 and signal PPM have the same polarity, the signal PPS1 and signal PPM are in opposite phases and the signal PPS2 and signal PPM are in opposite phases due to the arrangement (½ groove pitch) of the sub-beams in radial direction. Thus, the TE signal having the offset components canceled out can be obtained by subtracting the sum signal of the signal PPS1 and signal PPS2 from the signal PPM. In accordance with this TE signal, stable tracking servo is performed for the information track of the optical disc.

However, according to the above DPP method, the intervals between the main spot and two sub-beams need to conform to the ½ groove pitch in the radial direction of the optical disc. Conversely speaking, no good TE signals can be obtained for such an optical disc whose groove pitch largely deviates from twice the spot interval. Thus, upon recording/reproducing information in/from a plurality of kinds of optical discs having different groove pitches by means of one optical head using the TE signal by the DPP method, extra means such as the one for rotating the diffraction element for splitting the light beam into the main beam and two sub-beams about an optical axis to change directions of diffracted lights need to be provided in order to conform the spot interval in radial direction to ½ groove pitch based on the groove pitch of the optical disc by discriminating the kind of the optical disc, for example, among a DVD-RAM (storage capacity of 2.6 GB) with a groove pitch of 1.48 μm, a DVD-RAM (storage capacity of 4.7 GB) with a groove pitch of 1.23 μm, a DVD-R (Recordable) and a DVD-RW (Rewritable) with a groove pitch of 0.74 μm as optical discs of DVD (Digital Versatile Disc) standard.

In order to apply the DPP method to optical discs having different groove pitches without providing such means for rotating the diffraction element about the optical axis, there is proposed a technique for arranging a main spot and two sub-beams on the same track using a diffraction grating divided into a plurality of areas in which the phases of periodic structures of grating grooves are respectively different. Such a conventional technique is described below.

FIG. 13A is a plan view showing the periodic structures of grating grooves of a diffraction element (prior art 1) in a conventional optical head, and FIG. 13B is a diagram showing a phase distribution of a light beam diffracted by the periodic structure of the diffraction element of FIG. 13A (see, for example, FIG. 5 of Japanese Unexamined Patent Publication No. H09-81942).

In FIG. 13A, a diffraction element 60 of the prior art 1 includes two areas 61, 62 divided in a direction corresponding to a radial direction of an optical disc. The periodic structure of the grating grooves (shown by hatching) formed in the left area 62 differs from that of the grating grooves (shown by hatching) formed in the right area 61 by a ½ period.

$\pm 1^{st}$-order diffracted lights diffracted by such periodic structures have a phase distribution as shown in FIG. 13B.

If the phase of the light diffracted by the right area 61 of FIG. 13A is assumed to be a reference (zero), the phase of one of the $\pm 1^{st}$-order diffracted lights diffracted by the left area 62 advances by π and the phase of the other retards by π. In other words, if the phase of a right area 65 of FIG. 13B is assumed to be zero, the phase of a left area 66 is π, whereby the phase distribution is comprised of two phases. Further, there is no phase distribution in the main beam which is a $0^{th}$-order diffracted light.

Thus, also in the case of arranging the main spot and two sub-beams on the same track, a push-pull signal (signal PPM) detected by the main beam and push-pull signals (signal PPS1, signal PPS2) detected by the two sub-beams are in opposite phases. Accordingly, a TE signal having offset components canceled out can be obtained independently of differences in the groove pitches of the optical discs by subtracting a sum signal of the signal PPS1 and signal PPS2 from the signal PPM.

FIG. 14A is a plan view showing the periodic structures of grating grooves of a diffraction element (prior art 2) in another conventional optical head, and FIG. 14B is a diagram showing a phase distribution of a light beam diffracted by the periodic structure of the diffraction element of FIG. 14A (see, for example, FIG. 7 of Japanese Unexamined Patent Publication No. 2004-145915).

In FIG. 14A, a diffraction element 70 of the prior art 2 includes three areas 71, 72 and 73 divided in a direction corresponding to a radial direction of an optical disc. The periodic structure of the grating grooves (shown by hatching) formed in the right area 72 is shifted downward by a ¼ period from that of the grating grooves (shown by hatching) formed in the middle area 71, and the periodic structure of the grating grooves (shown by hatching) formed in the left area 73 is shifted upward by a ¼ period from that of the grating grooves (shown by hatching) formed in the middle area 71.

Since the phase of the light diffracted by such periodic structures change according to differences in the periodic structures substantially in the same manner as described above, there is a phase distribution as shown in FIG. 14B.

FIG. 14B is a diagram showing a phase distribution of one of ±1$^{st}$-order diffracted lights, and signs are reversed in a phase distribution of the other light. In FIG. 14B, if the phase of a middle area 75 is assumed to be a reference (zero), the phase in a right area 76 is +π/2 radian (+90°) and that in a left area 77 is −π/2 radian (−90°), whereby there is a phase distribution comprised of three phases. A phase difference between the phases in the left and right areas 76, 77 is π radian, which is the same phase difference as in the prior art 1 described above.

Thus, also in the case of arranging the main spot and two sub-beams on the same track, a push-pull signal (signal PPM) detected by the main beam and push-pull signals (signal PPS1, signal PPS2) detected by the two sub-beams are substantially in opposite phases. Accordingly, a TE signal having offset components canceled out can be obtained independently of differences in the groove pitches of the optical discs by subtracting a sum signal of the signal PPS1 and signal PPS2 from the signal PPM.

However, the above conventional three-beam optical heads have had the following problems.

First of all, the optical head using the diffraction element according to the prior art 1 has a problem that the amplitude of the TE signal largely decreases if the objective lens is displaced in the radial direction of the optical disc.

FIG. 15 is a graph (C1) showing a simulation result of a change in the amplitude of the TE signal by the DPP method in relation to an objective lens displacement in a radial direction in the case of reproducing information from a DVD-RAM with a groove pitch of 1.23 μm as an optical disc using the optical head including the diffraction element according to the prior art 1. It should be noted that vertical axis of FIG. 15 represents normalized amplitude with the amplitude of the TE signal when the objective lens displacement is zero (track center) set as 100%. As can be understood from a curve C1 of FIG. 15, the amplitude of the TE signal decreases about by 30% if the objective lens is displaced from the track center by ±0.2 mm.

Next, in the optical head using the diffraction element according to the prior art 2, a decreasing rate of the amplitude of the TE signal in relation to the objective lens displacement is suppressed low although the amplitude of the TE signal is more decreased as a whole as compared to the prior art 1 as shown by a curve C2 of FIG. 15.

However, the prior art 2 has had a problem that optimal positions of a sub-spots of the two sub-beams on the track differ in optical discs having different groove pitches. The reason for this is described in detail next.

FIG. 16 shows simulation waveforms of push-pull signals obtained from a main beam and two sub-beams in the case of optimally adjusting the arrangement of sub-spots for a DVD-R/RW with a groove pitch of 0.74 μm. Calculation was carried out on the condition that wavelength was 660 nm, NA 0.65 and groove pitch 0.74 μm, and the width of the middle area shown in FIG. 14B was 25% of the diameter of the transmitting beam 74 assuming that the respective beams had the same light amount. It should be noted that the optimal arrangement of the sub-spots is equivalent to an adjustment to maximize the amplitude of the TE signal by rotating the diffraction element for generating the sub-beams about the optical axis. In FIG. 16, the push-pull signals (signal PPS1, signal PPS2) obtained from the two sub-beams overlap because being in the same phase, and the phase thereof is displaced from that of the push-pull signal (signal PPM) obtained from the main beam by π radian.

On the other hand, FIG. 17 shows simulation waveforms of push-pull signals obtained from a main beam and two sub-beams in the case of having the same sub-spot arrangement as in the case of the aforementioned DVD-R/RW for a DVD-RAM with a groove pitch of 1.23 μm. Calculation conditions were the same as in the above case except the groove pitch. In FIG. 17, the signals PPS1, PPS2 have waveforms whose phases are displaced by the same amount in opposite directions from the groove center. Since the signals PPS1, PPS2 are added upon generating the TE signal, such a phase difference is canceled out and there can be obtained a TE signal that zero-crosses at the groove center.

However, if a light amount balance of the two sub-spots is lost due to part errors and assembling errors of the optical head such as the inclination of the optical axis of the emitted laser light and the inclination of the objective lens to differentiate the amplitudes of the signals PPS1, PPS2, such a phase difference cannot be canceled out and the TE signal has such a waveform as to zero-cross at a position displaced from the groove center. With such a TE signal, there has been a problem of reducing the accuracy of a tracking servo.

SUMMARY OF THE INVENTION

In view of the above problems, an object of the present invention is to provide an optical head including a diffraction element capable of improving the quality of a TE signal by a DPP method even if light amounts of two sub-spots are not balanced for optical discs having different groove pitches, and an optical disc device in which a highly accurate tracking servo is realized by including such an optical head.

One aspect of the present invention is directed to an optical head, comprising a light source for emitting a light; a diffraction element for splitting the light emitted from the light source into a main luminous flux that is not diffracted and a pair of auxiliary luminous fluxes that are diffracted and polarized; and an objective lens for focusing the main luminous flux and the pair of auxiliary luminous fluxes on an optical disc, wherein the diffraction element is divided in a direction corresponding to a radial direction of the optical disc into a first area, a second area adjacent to the first area and a third area adjacent to the second area; the second area is further divided into a fourth area and a fifth area adjacent to the fourth area; each divided area has a grating pattern of a periodic structure; the periodic structure of the first area is displaced from that of the fourth area by a ¼ period; the periodic structure of the third area is displaced from that of the first area by a ½ period; and the periodic structure of the fifth area is displaced from that of the third area by a ¼ period and from that of the fourth area by a ½ period.

Another aspect of the present invention is directed to an optical disc device for recording and/or reproducing an information signal in and/or from an optical disc, comprising a spindle motor for rotating the optical disc; an optical head according to the present invention including a light receiving element for receiving the main luminous flux and the pair of auxiliary luminous fluxes reflected by the optical disc and having transmitted the objective lens with a light receiving surface divided into a plurality of light detection areas and converting the respective luminous fluxes into electrical signals corresponding to light amounts of the respective luminous fluxes, and an actuator for driving the objective lens at least in a radial direction relative to the optical disc; a signal processor for generating a tracking error signal by a differential push-pull method from the electrical signals received from the light receiving element of the optical head; and a controller for controlling the driving of the spindle motor and performing a tracking servo for the optical disc by controlling the driving of the actuator of the optical disc in accordance with the tracking error signal received from the signal processor.

These and other objects, features, aspects and advantages of the present invention will become more apparent upon a reading of the following detailed description with reference to accompanying drawings.

BRIEF DESCRIPTION OF THE DRAWINGS

FIG. 2 is a diagram showing a positional relationship of three spots on a DVD in the case of using the optical head according to the first embodiment of the invention.

DETAILED DESCRIPTION OF THE PREFERRED EMBODIMENTS OF THE INVENTION

Hereinafter, embodiments of the present invention are described with reference to the accompanying drawings. It should be noted that the following embodiments are merely specific examples of the present invention and do not restrict the technical scope of the present invention. Further, the following embodiments are described, taking a three-beam optical head capable of interchangeably reproducing information from optical discs having different groove pitches, i.e. DVD-RAMS and DVD-R/RW as an example.

First Embodiment

Figure 1:
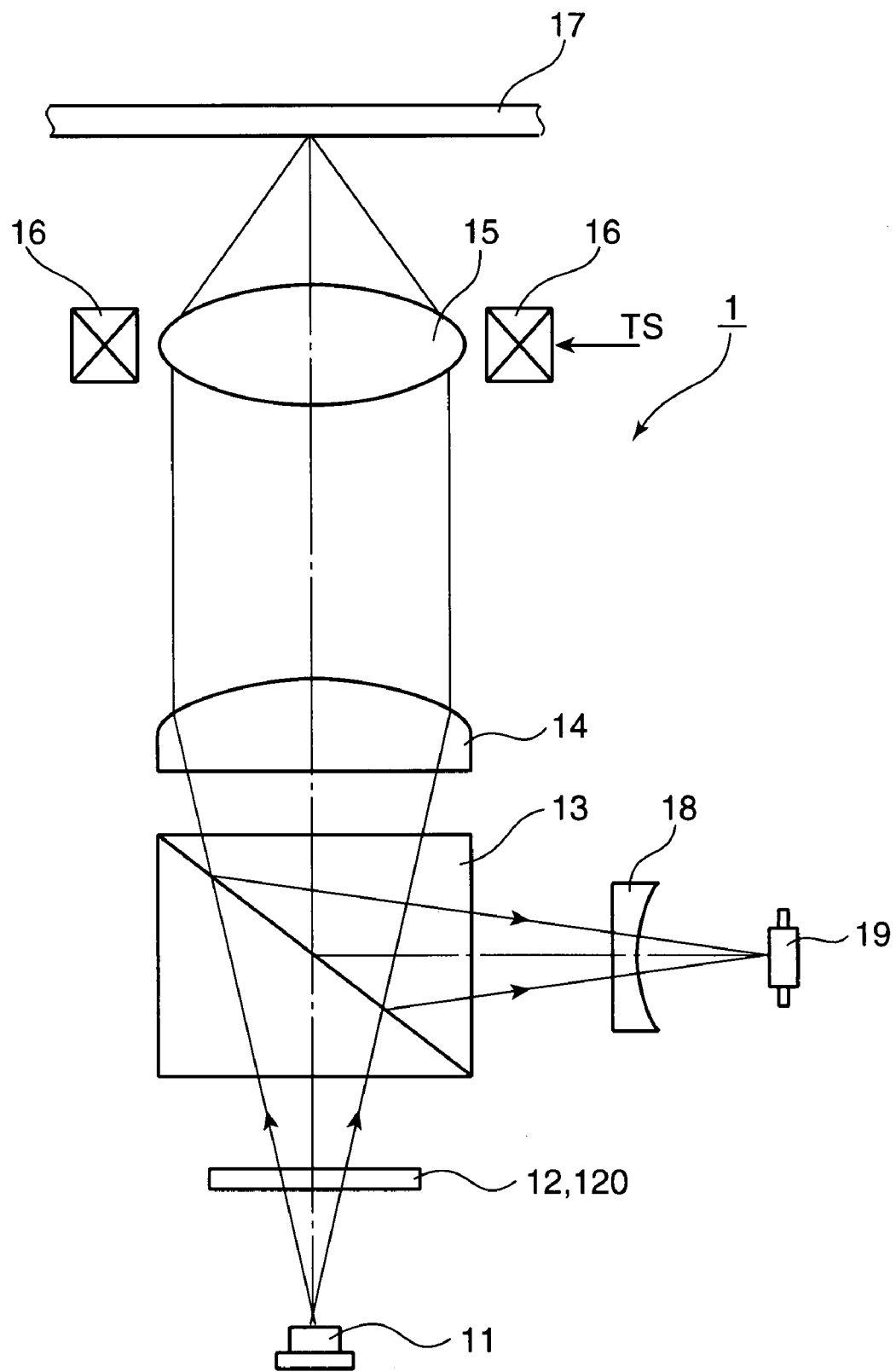
FIG. 1 is a schematic construction diagram of an optical head according to a first embodiment of the invention.

FIG. 1 is a schematic construction diagram of an optical head according to a first embodiment of the present invention. In FIG. 1, the optical head 1 is provided with a semiconductor laser 11 as a light source, a diffraction element 12, a beam splitter 13, a collimator lens 14, an objective lens 15 for focusing a laser beam on an optical disc 17, an actuator 16 for the objective lens 15, a detection lens 18 and a light receiving element 19. In the following description, the term "DVD" is understood to encompass DVD-RAMS and DVD R/RWs, and is identified with the reference numeral 17.

A red laser beam in a wavelength range of 630 nm to 680 nm (normally, 660 nm) emitted from the semiconductor laser 11 is split into a main beam (main luminous flux) as a $0^{th}$-order diffracted light that is not diffracted and two sub-beams (a pair of auxiliary luminous fluxes) as $\pm 1^{st}$-order diffracted lights that are diffracted and polarized, and the main beam and two sub-beam transmit the beam splitter 13 and are converted from divergent beams to parallel beams by the collimator lens 14 and focused on the DVD 17 by the objective lens 15 to form a main spot and two sub-spots on an information track.

FIG. 2 is a diagram showing a positional relationship of three spots on the DVD 17 (groove pitch Tp is 0.74 μm in the case of a DVD-R/RW and 1.23 μm in the case of a DVD-RAM having a storage capacity of 4.7 GB) in the case of using the optical head 1 including the diffraction element 12 shown in FIG. 1. In FIG. 2, a main spot 22 and two sub-beams 23, 24 are arranged on one information track (groove) 21, and each of the two sub-spots is a light spot having two intensity peaks. FIG. 2 is further described later.

The main beam and two sub-beams reflected by the DVD 17 transmit the objective lens 15 and collimator lens 14, are reflected by the beam splitter 13 and divided and focused on three four-divided photodetectors on the light receiving element 19 by the detection lens 18, whereby the main beam and two sub-beams are detected as electrical signals corresponding to the light amounts thereof by the three four-divided photodetectors.

Figure 3A:
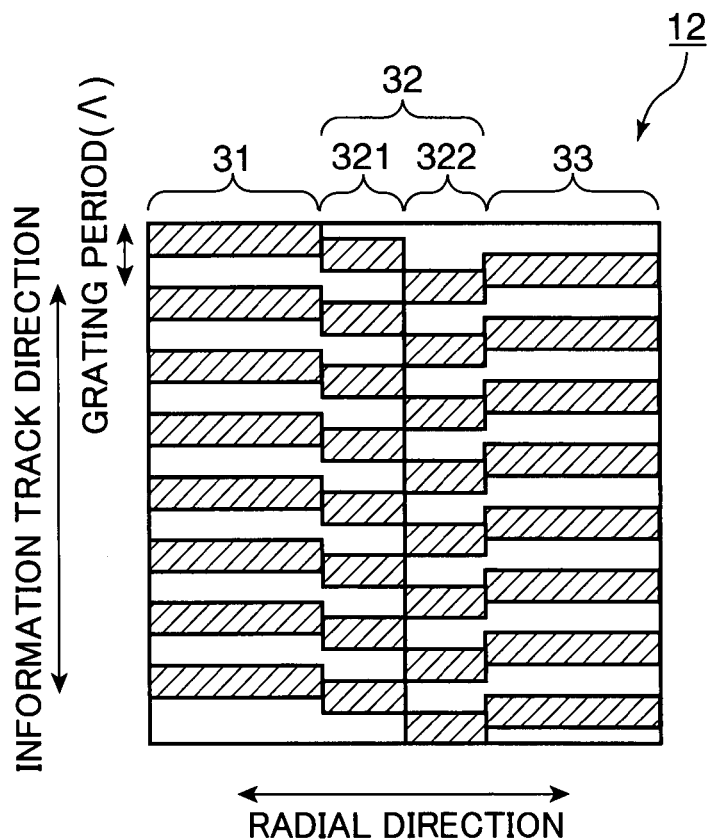
FIG. 3A is a plan view showing periodic structures of grating grooves of a diffraction element in the optical head according to the first embodiment of the invention.

FIG. 3A is a plan view showing periodic structures of grating grooves of the diffraction element 12 in the optical head 1 according to the first embodiment of the present invention. In FIG. 3A, the diffraction element 12 is divided into a first area 31 on the left side, a second area 32 in the middle and a third area 33 on the right side in a direction corresponding to a radial direction of the DVD 17. It should be noted that the grating grooves are shown by hatching in FIG. 3A. The second area 32 in the middle is further divided into a fourth area 321 and a fifth area 322 in the direction corresponding to the radial direction of the DVD 17.

Each divided area has a grating pattern of a grating period Λ, wherein the periodic structure of the first area 31 on the left side is displaced upward from that of the fourth area 321 by a ¼ period; the periodic structure of the third area 33 on the right side is displaced downward from that of the first area 31 on the left side by a ½ period; and the periodic structure of the fifth area 322 is displaced downward from that of the third area 33 on the right side by a ¼ period and from that of the fourth area 321 by a ½ period.

Figure 3B:
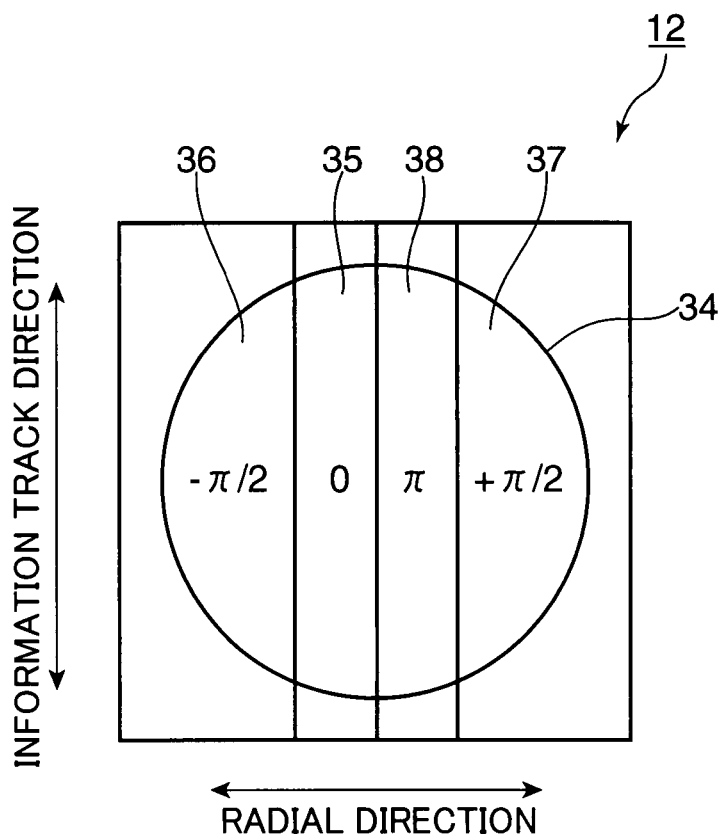
FIG. 3B is a diagram showing a phase distribution of a light beam diffracted by the periodic structures of the diffraction element of FIG. 3A.

FIG. 3B is a diagram showing a phase distribution of a light beam diffracted by the periodic structures of the diffraction element 12 of FIG. 3A. Areas shown in FIG. 3B correspond to those shown in FIG. 3A. Specifically, the area 31 corresponds to an area 36, the area 321 to an area 35, the area 322 to an area 38, and the area 33 to an area 37. Further, an area 34 represents a light spot of the main beam.

By these periodic structures of the diffraction element 12, the main beam transmits as it is without having a phase distribution added thereto, and the two diffracted sub-beams are respectively converted into wavefronts having a phase distribution comprised of four phases, i.e. a reference (zero) phase as the phase of the light having transmitted the area 35, −π/2 radian by the area 36, +π radian by the area 38 and +π/2 radian by the area 37 while having opposite phase relationships as described above.

By such a phase distribution, i.e. such that a phase difference of lights in areas transversely equidistant from the center of the transmitting beam, the sub-beam focused on the DVD 17 becomes a light spot whose intensity distribution has two peaks as can be seen in the diagram of FIG. 2.

Next, the reason why the quality of a TE signal by a DPP method can be improved by giving the phase distribution as above to the sub-beams even if the light amounts of the two sub-spots are not balanced is described.

Figure 4:
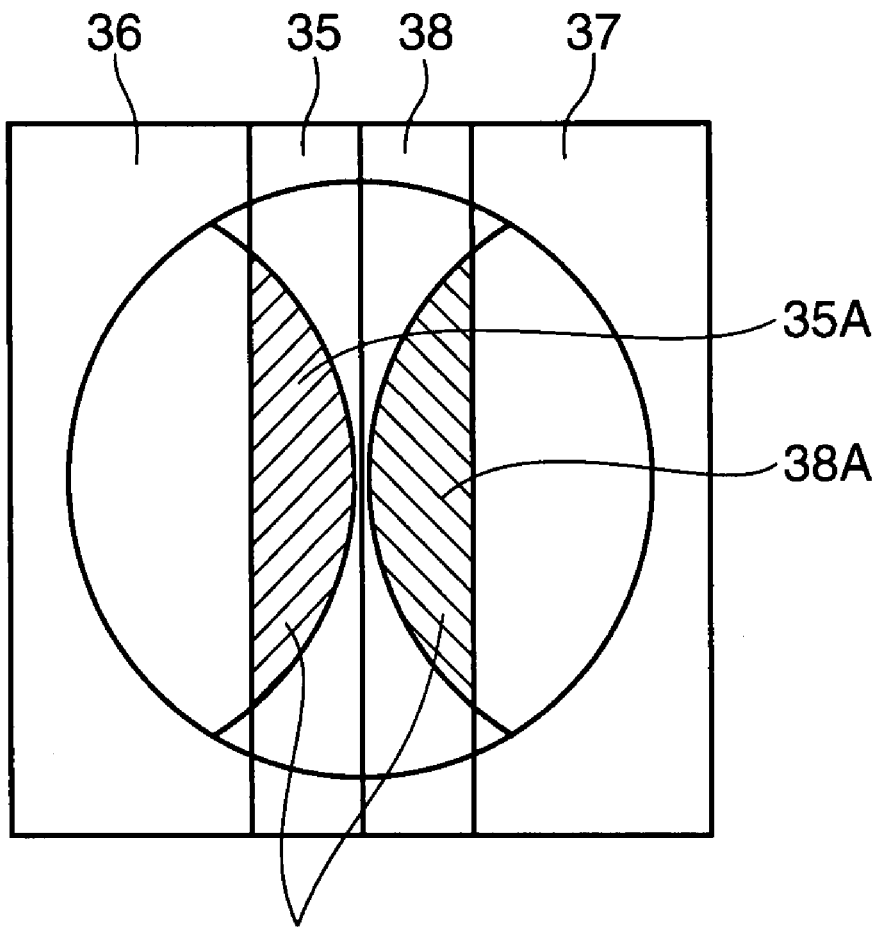
FIG. 4 is a diagram showing a state of a reflected light from a DVD diffracted by an information track in a superimposed manner on arranged areas of FIG. 3B.

FIG. 4 is a diagram showing a state of a reflected light from the DVD 17 diffracted by the information track in a superimposed manner on the respective arranged areas of FIG. 3B. The overlap of a circle and two arcs in FIG. 4 represents the overlap of $\pm 1^{st}$-order diffracted lights and $0^{th}$-order diffracted light by the information track, assuming a DVD-RAM. Since the DVD-RAM has a wider groove pitch, angles of diffraction of the $\pm 1^{st}$-order diffracted lights by the information track are small and overlapping parts of these diffracted lights lie within the areas 35, 38. Hatched portions 35A, 38A are both areas where the $0^{th}$-order diffracted light and $\pm 1^{st}$-order diffracted lights by the information track overlap, and interferences are generated according to their phase differences.

Figure 5A:
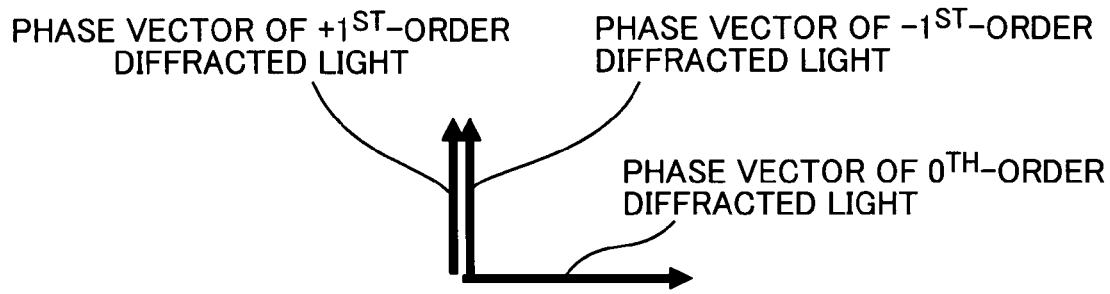
FIG. 5A is a phase vector diagram of lights in a reflected light of the main beam.
Figure 5B:
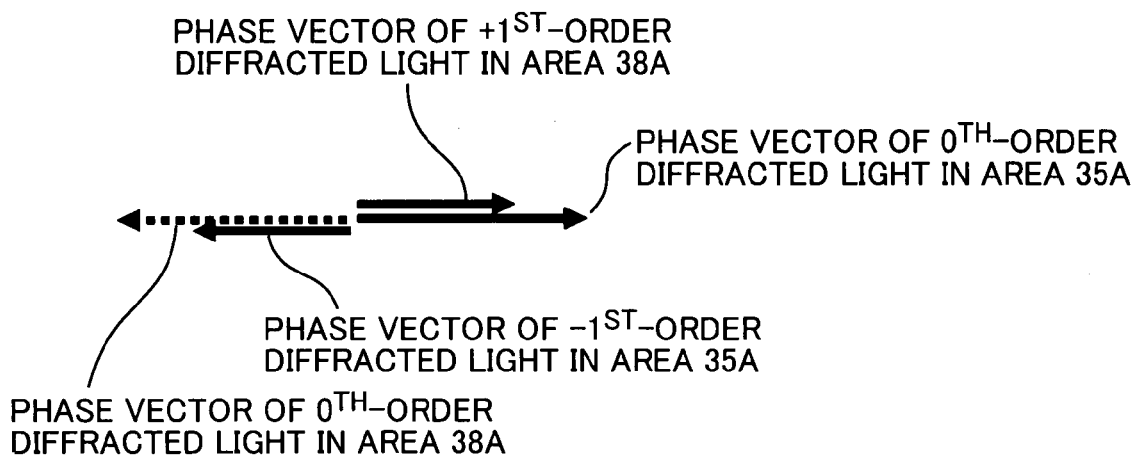
FIG. 5B is a phase vector diagram of lights in a reflected light of a sub-beam according to the invention.
Figure 5C:
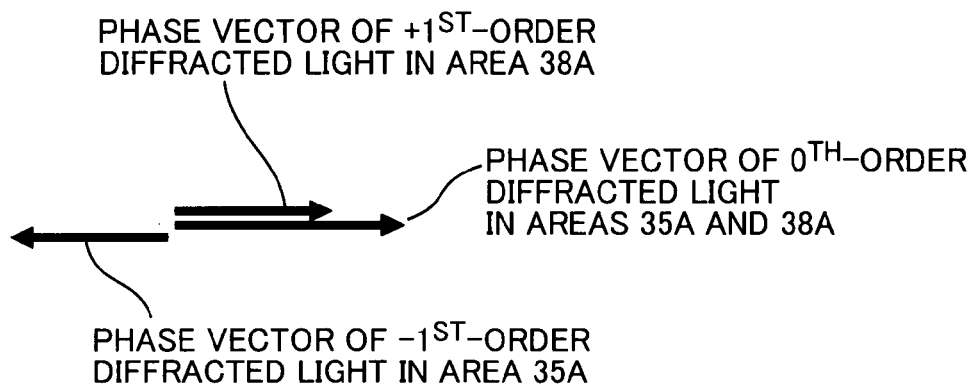
FIG. 5C is a phase vector diagram of lights in a reflected light of a sub-beam according to a prior art 2.

FIGS. 5A to 5C are diagrams showing the phases of the $0^{th}$-order diffracted light and $\pm 1^{st}$-order diffracted lights diffracted by the information track in the form of vectors. FIG. 5A shows phase vectors of the respective diffracted lights in the reflected light of the main beam when the main spot on the DVD 17 is located in the center of the information track. Since the $\pm 1^{st}$-order diffracted lights are both at 90° to the $0^{th}$-order diffracted light, states of light interference are equal. Thus, the intensity distributions of the areas where the $0^{th}$-order diffracted light and $\pm 1^{st}$-order diffracted lights overlap are equal in the main beam, and a detected push-pull signal is a signal that zero-crosses in the center of the information track.

FIG. 5B shows phase vectors of the respective diffracted lights in the areas 35A, 38A of the sub-beams as a feature of the present invention when the main spot on the DVD 17 is located in the center of the information track. In the present invention, since the sub-beams are converted into the wavefronts having the phase distribution comprised of four phases, i.e. the reference (zero) phase as the phase of the light having transmitted the area 35, −π/2 radian by the area 36, +π radian by the area 38 and +π/2 radian by the area 37, a phase difference between the $0^{th}$-order diffracted light and $-1^{st}$-order diffracted light in the area 35A is 180° and a phase difference between the $0^{th}$-order diffracted light and $+1^{st}$-order diffracted light in the area 38A is also 180°, i.e. both phase differences are equal. Accordingly, light intensity distributions in the areas 35A, 38A shown in FIG. 4 are equal, and push-pull signals detected from these areas are signals that zero-cross in the center of the information track.

FIG. 5C is a diagram showing the phases of the diffracted lights in the areas 35A, 38A in the form of vectors similar to the above for the prior art 2. In the prior art 2, since the phase of the $0^{th}$-order diffracted light is the same in these areas, a phase difference between the $0^{th}$-order diffracted light and $-1^{st}$-order diffracted light in the area 35A is 180° and a phase difference between the $0^{th}$-order diffracted light and $+1^{st}$-order diffracted light in the area 38A is 0°. By an effect of light interference, the lights weaken each other at a phase difference of 180° while strengthening each other at a phase difference of 0°. Accordingly, light intensity in the area 35A decreases, and light intensity in the area 38A increases. Thus, push-pull signals detected from these areas do not zero-cross in the center of the information track.

As described above, unlike the prior art 2, the light intensity distributions in the areas 35A, 38A in the reflected light of the sub-beam can be equalized when the main spot is located in the center of the information track.

Figure 6:
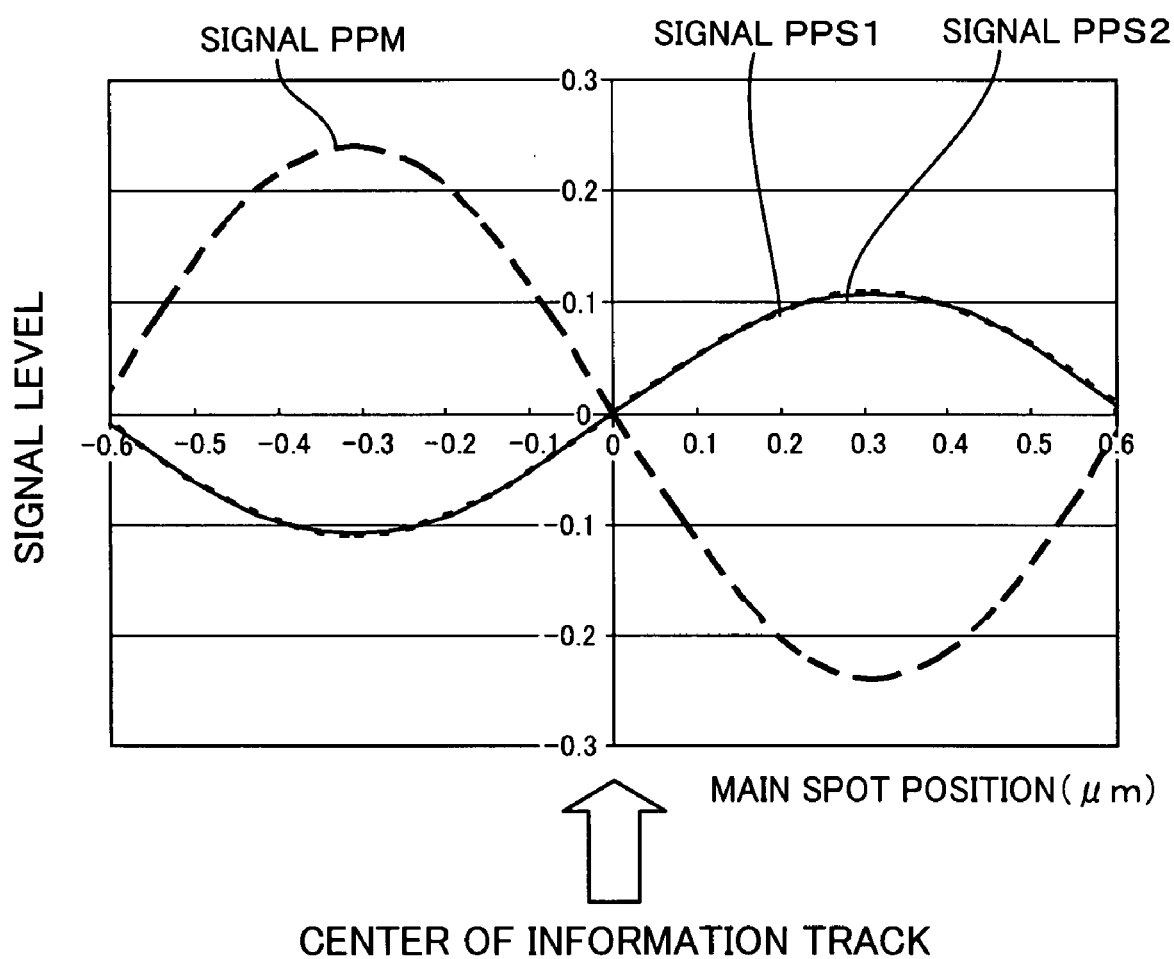
FIG. 6 is a graph showing a simulation result of waveforms of push-pull signals obtained from a main beam and two sub-beams for a DVD-RAM in the optical head according to the first embodiment of the invention.

FIG. 6 shows a simulation result of waveforms of push-pull signals obtained from the main beam and two sub-beams for a DVD-RAM, the groove pitch of the information tracks of which is 1.23 μm, for this embodiment of the present invention. The main spot and two sub-beams are arranged on the center of the same information track as shown in FIG. 2 and calculation conditions are the same as in the prior arts. In FIG. 6, signals PPS1, PPS2 have waveforms overlapping and zero-crossing in the groove center. Accordingly, even if the amplitudes of the signals PPS1, PPS2 differ, there can be obtained a good TE signal after the calculation by the DPP method, a zero-crossing point of which signal does not change.

In the DVD-R/RW having a narrow groove pitch, there are no overlapping parts of the $0^{th}$-order diffracted light and $+1^{st}$-order diffracted lights in the areas 35, 38 since angles of diffraction of the $\pm 1^{st}$-order diffracted lights diffracted by the information track are large. Accordingly, in the DVD-R/RW, a good TE signal can be obtained as in the prior art 2 described above.

As described above, according to the first embodiment, optimal sub-spot arrangement can be realized for optical discs having different groove pitches, e.g. for DVD-RAMS and DVD-R/RWs while the main spot and two sub-spot are arranged in the center of the same information track. Specifically, since the push-pull signals PPS1, PPS2 corresponding to the two sub-beams are signals that zero-cross in the center of the information track independently of the groove pitch, a maximum amplitude of the TE signal can be realized with the same spot arrangement. Further, even if the light amounts of the two sub-beams are not balanced, the quality of the TE signal can be improved since the TE signal by the DPP method zero-crosses in the center of the track.

Although the width of the middle area shown in FIG. 3B is simulated as 25% of the diameter of the transmitting sub-beam, similar effects can be obtained within a range of 15 to 35% of the diameter of the sub-beam.

Second Embodiment

A second embodiment of the present invention differs from the first embodiment in the construction of the diffraction element. Since the other construction is the same as in the first embodiment, it is not described in detail by being identified by the same reference numerals. Only points of difference from the first embodiment are described below.

Figure 7A:
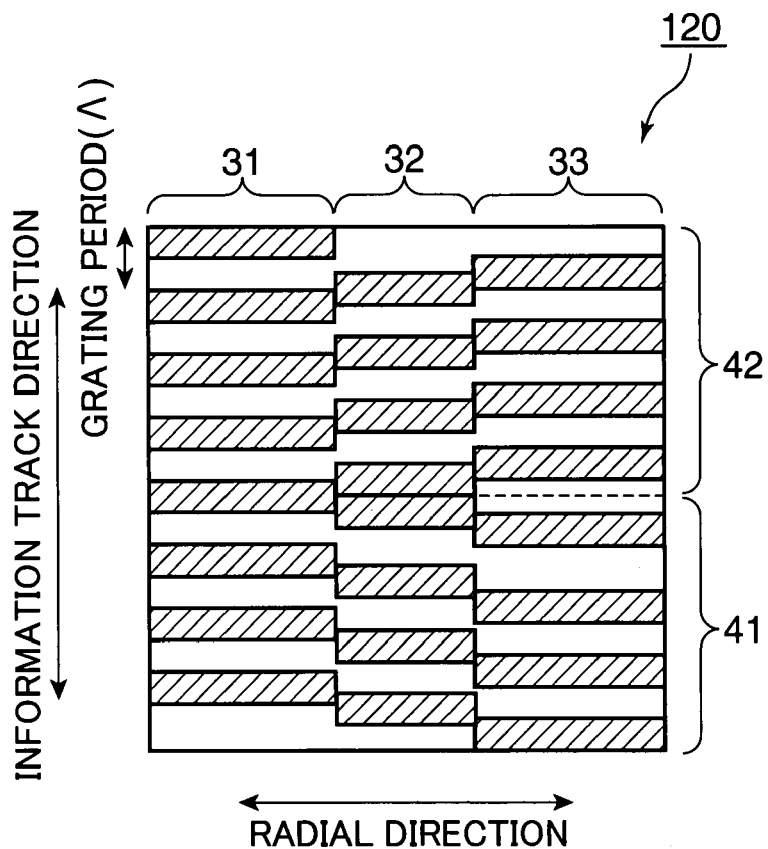
FIG. 7A is a plan view showing periodic structures of grating grooves of a diffraction element in an optical head according to a second embodiment of the invention.

FIG. 7A is a plan view showing periodic structures of grating grooves of a diffraction element 120 in an optical head 1 according to the second embodiment of the present invention. In FIG. 7A, the diffraction element 120 is divided into a first area 31 on the left side, a second area 32 in the middle and a third area 33 on the right side in a direction corresponding to a radial direction of a DVD 17. It should be noted that grating grooves are shown by hatching in FIG. 7A. The second area 32 in the middle is further divided into a fourth area 41 and a fifth area 42 in a direction corresponding to an information track direction of the DVD 17.

Each divided areas has a grating pattern of a grating period $\Lambda$, wherein the periodic structure of the first area 31 on the left side is displaced upward from that of the fourth area 41 by a ¼ period; the periodic structure of the third area 33 on the right side is displaced downward from that of the first area 31 on the left side by a ½ period; and the periodic structure of the fifth area 42 is displaced downward from that of the third area 33 on the right side by a ¼ period. Further, in the second area 32 in the middle, the periodic structure of the fifth area 42 is displaced downward from that of the fourth area 41 by a ½ period.

Figure 7B:
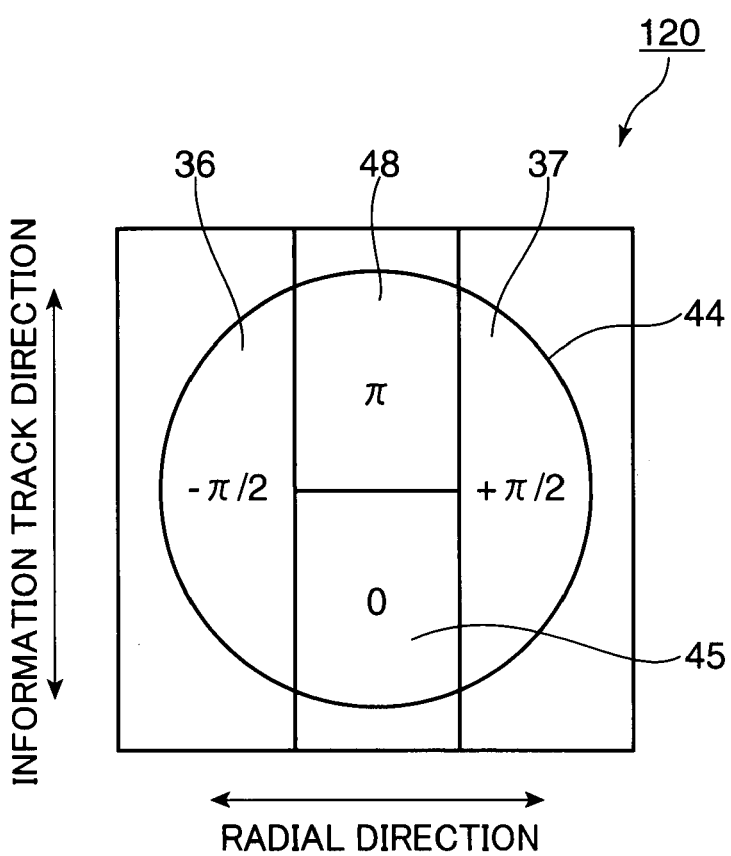
FIG. 7B is a diagram showing a phase distribution of a light beam diffracted by periodic structures of the diffraction element of FIG. 7A.

Since the phase of the light diffracted by such periodic structures change according to differences of the periodic structures in the same manner as described above, there is a phase distribution as shown in FIG. 7B. FIG. 7B is a diagram showing a phase distribution of a light beam diffracted by the periodic structures of the diffraction element 120 of FIG. 7A. Areas shown in FIG. 7B correspond to those shown in FIG. 7A. Specifically, the area 31 corresponds to an area 36, the area 41 to an area 45, the area 42 to an area 48, and the area 33 to an area 37. Further, an area 44 represents a light spot of the main beam.

FIG. 7B is a diagram showing a phase distribution of one of the $\pm 1^{st}$-order diffracted lights, and signs of a phase distribution of the other diffracted light are reversed. In FIG. 7B, this $1^{st}$-order diffracted light is converted into a wavefront having a phase distribution comprised of three phases, i.e. a reference (zero) phase as the phase in the middle area 45, $-\pi/2$ radian by the first area 36 and $+\pi/2$ radian by the third area 37, a wavefront having a phase distribution comprised of three phases, i.e. $-\pi/2$ radian by the first area 36, $+\pi$ radian by the fifth area 48 and $+\pi/2$ radian by the third area 37, and a wavefront having a phase distribution comprised of two phase, i.e. a zero by the fourth area 45 and $+\pi$ radian by the fifth area 48 in the information track direction.

Next, it is described that effects similar to those of the aforementioned first embodiment can be fulfilled by giving the above phase distributions of this embodiment.

Figure 8:
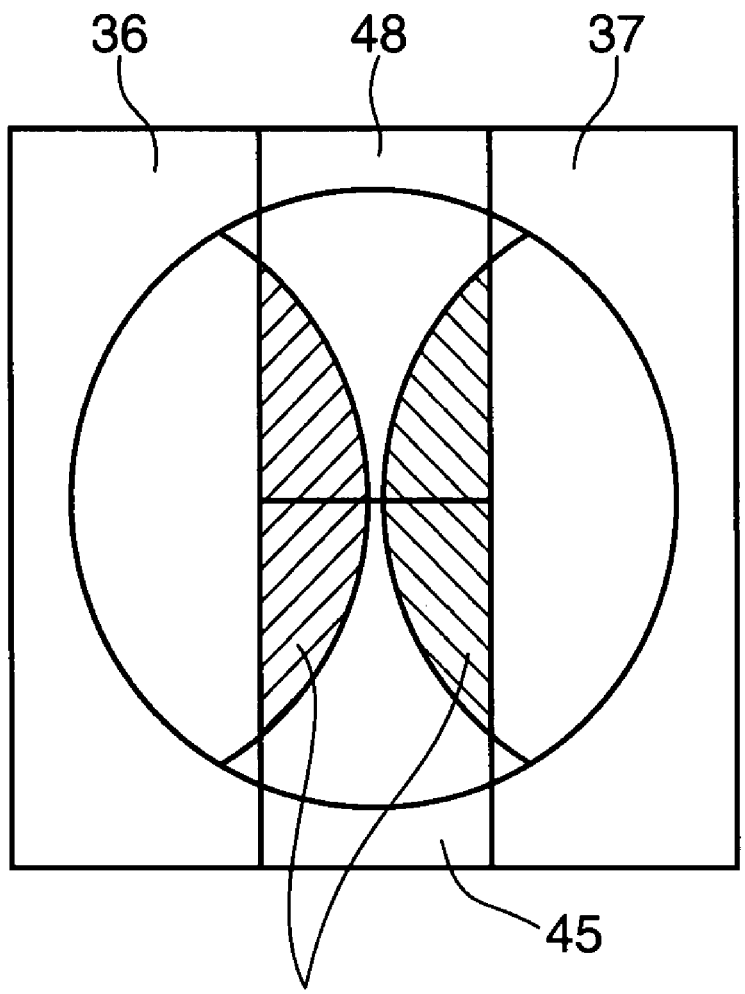
FIG. 8 is a diagram showing a state of a reflected light of a sub-beam diffracted by an information track.

FIG. 8 is a diagram showing a state of a reflected light of the sub-beam diffracted by an information track. Similar to the description of FIG. 4, hatched portions are overlapped portions of the $0^{th}$-order diffracted light and $\pm 1^{st}$-order diffracted lights diffracted by the information track. A difference between a part where the $0^{th}$-order diffracted light and $+1^{st}$-order diffracted lights overlap inside the area 45 and a part where the $0^{th}$-order diffracted light and $\pm 1^{st}$-order diffracted lights overlap inside the area 48 is that the phase of the $0^{th}$-order diffracted light differ by $\pi$. Accordingly, by an addition effect upon detecting the signal PPS1 or PPS2, the contributions of the areas 45, 48 are canceled out, and the signals PPS1, PPS2 become signals that zero-cross in the center of the information track similar to the first embodiment.

As described above, according to the second embodiment, an optimal sub-spot arrangement can be realized for optical discs having different groove pitches, e.g. for DVD-RAMS and DVD-R/RWs while the main spot and two sub-spot are arranged in the center of the same information track. Specifically, since the push-pull signals PPS1, PPS2 corresponding to the two sub-beams are signals that zero-cross in the center of the information track independently of the groove pitch, a maximum amplitude of the TE signal can be realized with the same spot arrangement. Further, even if the light amounts of the two sub-beams are not balanced, the quality of the TE signal can be improved since the TE signal by the DPP method zero-crosses in the center of the track.

Although the width of the middle area shown in FIG. 7B is simulated as 25% of the diameter of the transmitting sub-beam, similar effects can be obtained within a range of 15 to 35% of the diameter of the sub-beam.

Further, the first and second embodiments may be combined. For example, as shown in a phase distribution of FIG. 9, the diffraction element 120 is divided into a first area 36 on the left side, a second area 39 in the middle and a third area 37 on the right side, which are adjacent to each other in the radial direction of the DVD 17. Here, the second area 39 is divided into a fourth area 45 and a fifth area 48 adjacent to each other in the information track direction of the DVD 17. Further, the fourth area 45 is divided into a sixth area 45a and a seventh area 45b adjacent to each other in the radial direction of the DVD 17, and the fifth area 48 is divided into an eighth area 48a and a ninth area 48b adjacent to each other in the radial direction of the DVD 17.

Figure 9:
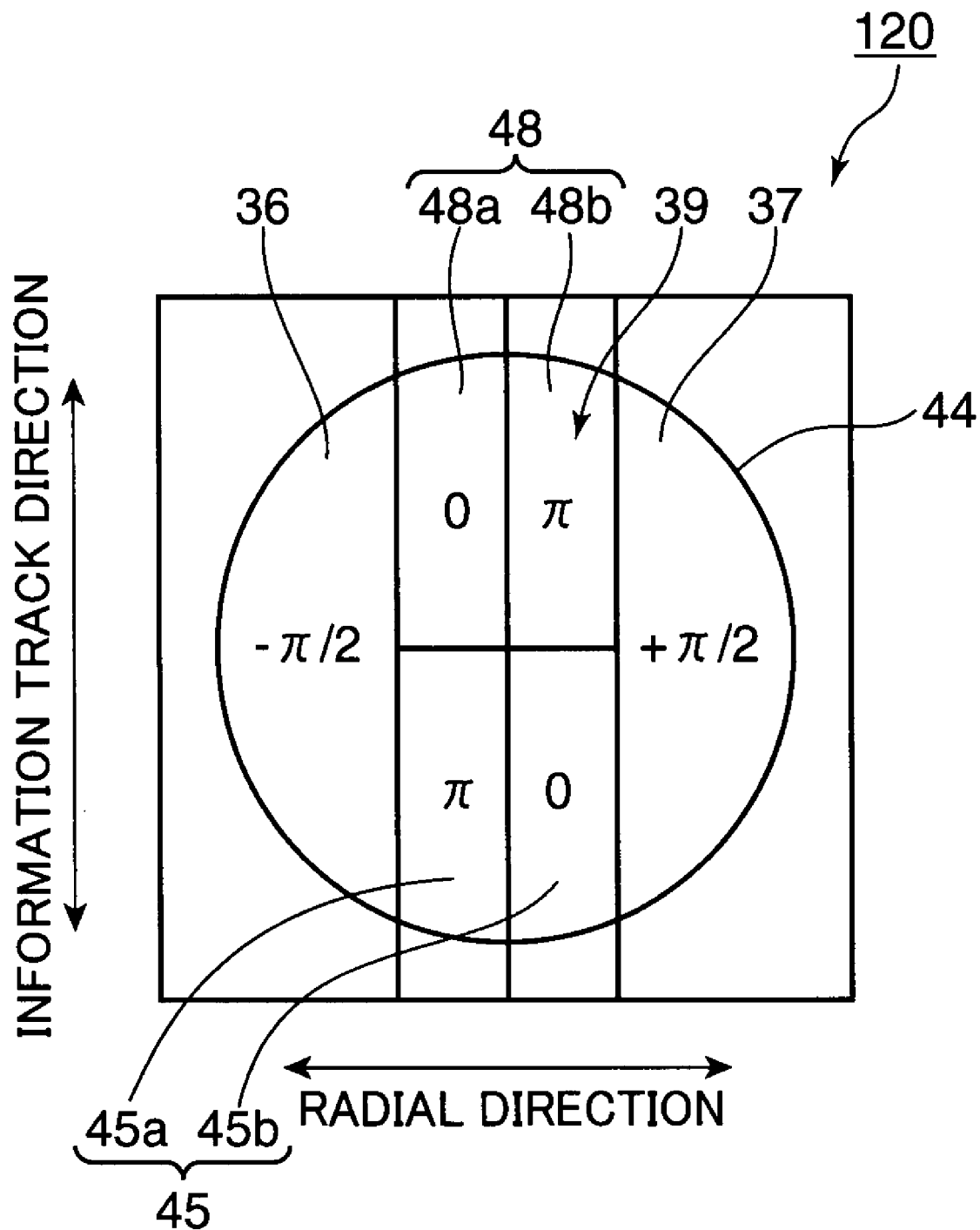
FIG. 9 is a diagram showing a phase distribution of a light beam diffracted by a diffraction element according to a modification of the first and second embodiments.

FIG. 9 is a diagram showing a phase distribution of one of the $\pm 1^{st}$-order diffracted lights, and signs of a phase distribution of the other diffracted light are reversed. In FIG. 9, it is assumed that phases in the seventh area 45b and eighth area 48a in the middle are reference (zero). In this case, in the radial direction of the DVD 17, this $1^{st}$-order diffracted light is converted into a wavefront having a phase distribution comprised of four phases, i.e. $-\pi/2$ radian by the first area 36, zero by the eighth area 48a, $+\pi$ radian by the ninth area 48b and $+\pi/2$ radian by the third area 37, and a phase distribution comprised of four phases, i.e. $-\pi/2$ radian by the first area 36, $+\pi$ radian by the sixth area 45a, zero by the seventh area 45b and $+\pi/2$ radian by the third area 37. Further, in the information track direction of the DVD 17, this $1^{st}$-order diffracted light is converted into a wavefront having a phase distribution comprised of two phases, i.e. zero by the eighth area 48a and $+\pi$ radian by the sixth area 45a and a phase distribution comprised of two phases, i.e. $+\pi$ radian by the ninth area 48b and zero by the seventh area 45b.

Specifically, the periodic structure of the sixth area 45a is displaced from that of the seventh area 45b by a ½ period and the periodic structure of the eighth area 48a is displaced from that of the ninth area 48a by a ½ period, so that the periodic structures of the sixth and ninth areas 45a, 48b are equal.

With this construction, when an asymmetry in the transverse phase distribution of the sixth and seventh areas 45a, 45b causes an asymmetry in the intensity distribution, the asymmetry in the intensity distribution can be cancelled by the reverse asymmetry in the transverse phase distribution of the eighth and ninth areas 48*a*, 48*b* utilizing the vertical symmetry of the reflected light of the sub-beam diffracted by the information track. Further, although the phases of the respective areas in the middle are π, 0 in FIG. 9 when the phase of the eighth area 48*a* is 0, this embodiment is not limited to these numerical values.

Third Embodiment

Figure 10:
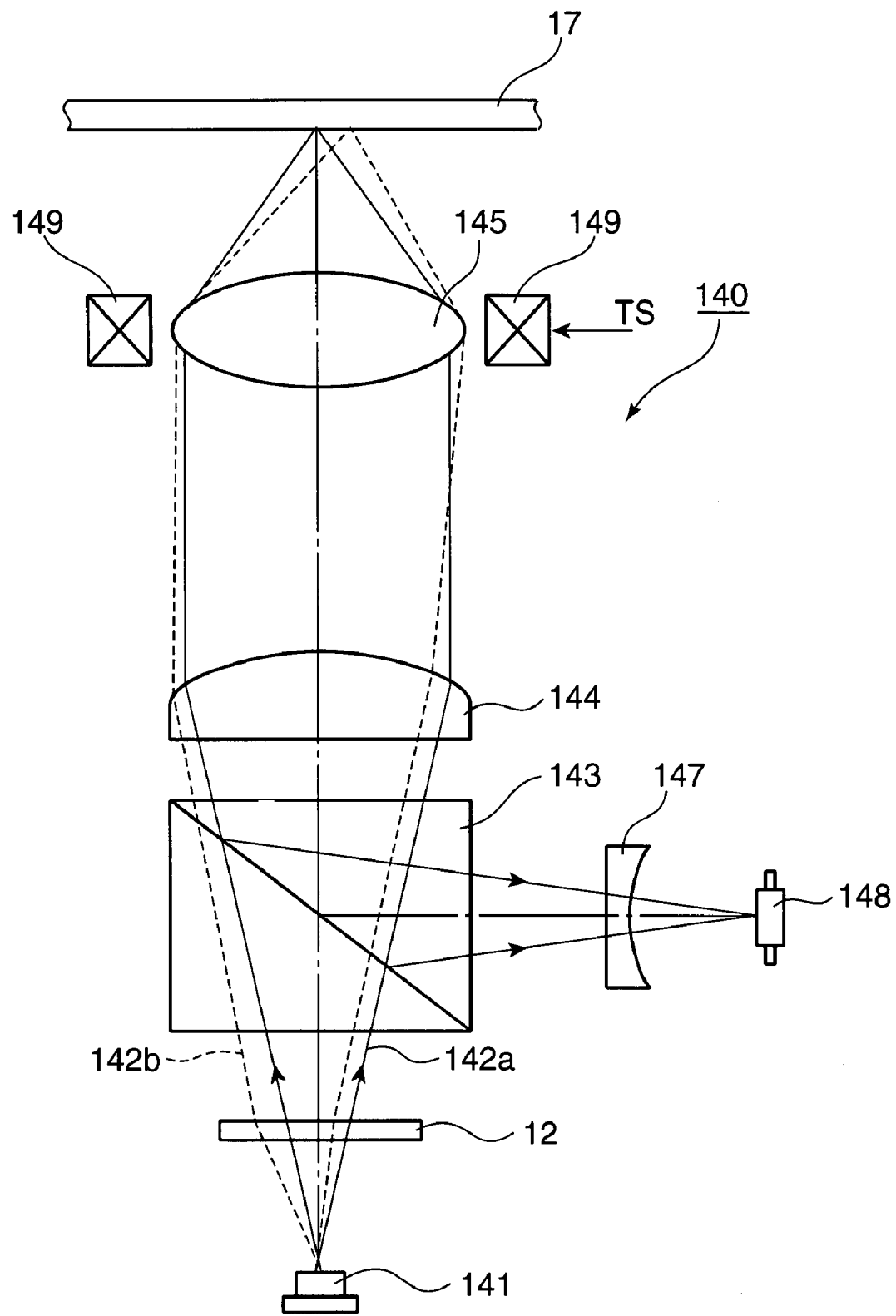
FIG. 10 is a diagram showing the construction of an optical head according to a third embodiment.

Next, an optical head according to a third embodiment is described. FIG. 10 is a diagram showing the construction of the optical head according to the third embodiment. The optical head 140 shown in FIG. 10 is characterized in that a diffraction element is arranged in proximity to a light source. The optical head 140 is provided with a light source 141, a diffraction element 12, a beam splitter 143, a collimator lens 144, an objective lens 145, a detection lens 147, a light receiving element 148 and an actuator 149.

The light source 141 has the same construction as the semiconductor light source 11 shown in FIG. 1 and emits a red laser beam in a wavelength range of 630 nm to 680 nm. Solid lines 142*a* represent a main beam, and dotted lines 142*b* represent one of two sub-beams.

Since the diffraction element 12, beam splitter 143, collimator lens 144, objective lens 145, detection lens 147, light receiving element 148 and actuator 149 shown in FIG. 10 have the same constructions as the diffraction element 12, beam splitter 13, collimator lens 14, objective lens 15, detection lens 18, light receiving element 19 and actuator 16 shown in FIG. 1, they are not described here.

Figure 11:
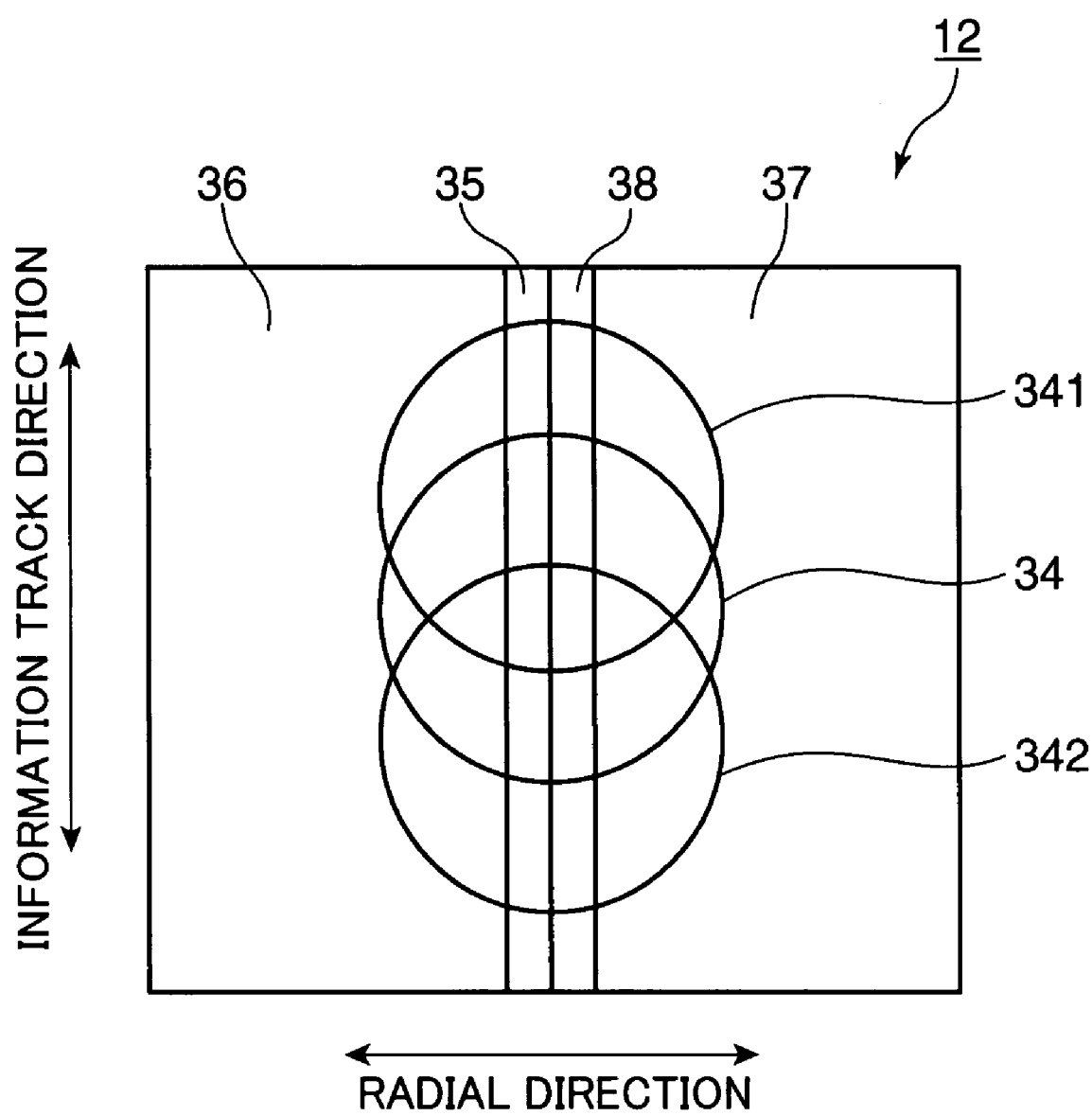
FIG. 11 is a diagram showing a state of a reflected light from an optical disc diffracted by an information track in a superimposed manner on the arranged areas of FIG. 3B.

Since the light source 141 and diffraction element 12 are arranged proximate to each other, a light path of the main beam and that of the sub-beams largely deviate from each other. FIG. 11 is a diagram showing the positions of the main beam and sub-beams transmitting the diffraction element 12 in a superimposed manner on the respective arranged areas of FIG. 3B. A main spot area 34 shown in FIG. 11 represents a light spot of the main beam, a first sub-spot area 341 represents a light spot of one of a pair of sub-beams, and a second sub-spot area 342 represents a light spot of the other sub-beam. As shown, the two sub-beams transmit the diffraction element 12 while being displaced in an information track direction of an optical disc.

The diffraction element 12 is divided into a first area 31, a second area 32 and a third area 33 in a direction corresponding to a radial direction of an optical disc 146, wherein the second area 32 is further divided into a fourth area 321 and a fifth area 322 in the direction corresponding to the radial direction of the optical disc 146 and each divided area has a grating pattern of a periodic structure (see FIG. 3A). Thus, even if a pair of sub-beams are displaced in the information track direction of the optical disc 146, the diffraction element 12 can give the same phase distribution to the both sub-beams. It should be noted that the areas shown in FIG. 11 and those shown in FIG. 3A correspond as follows. The area 31 corresponds to the area 36, the area 321 to the area 35, the area 322 to the area 38 and the area 33 to the area 37.

The diffraction element 120 shown in FIG. 7A is divided into the first area 31, second area 32 and third area 33 in the direction corresponding to the radial direction of the optical disc 146, the second area 32 is further divided into the fourth area 41 and fifth area 42, and each divided area has the grating pattern of the period structure. For example, if the diffraction element 120 shown in FIG. 7A is applied to the optical head according to the third embodiment, the diffraction element 120 cannot give the same phase distribution to the both sub-beams since the first sub-spot area 341 and second sub-spot area 342 are formed side by side in the information track direction of the optical disc 146. Accordingly, in the case of such a construction that the light source and diffraction element are proximate to each other as shown in the third embodiment, it is preferable to use the diffraction element 12 shown in FIG. 3A rather than to use the diffraction element 120 shown in FIG. 7A. If the diffraction element 12 of FIG. 3A is used, a desired phase distribution can be equally given to the two sub-beams independently of a distance between the light source and de.

Fourth Embodiment

Figure 12:
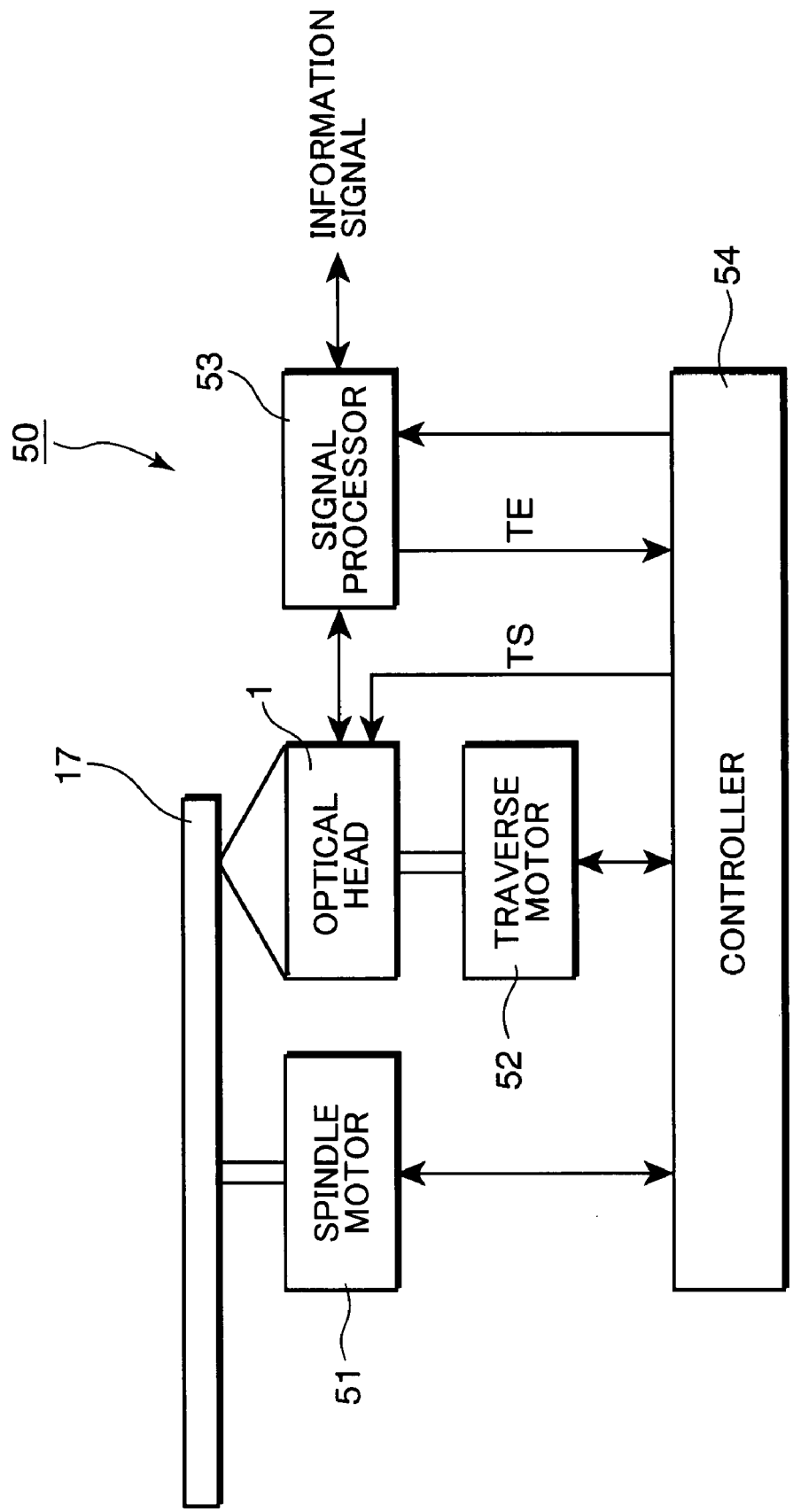
FIG. 12 is a functional block diagram showing the schematic construction of an optical disc device according to a fourth embodiment of the invention.
Figure 13A:
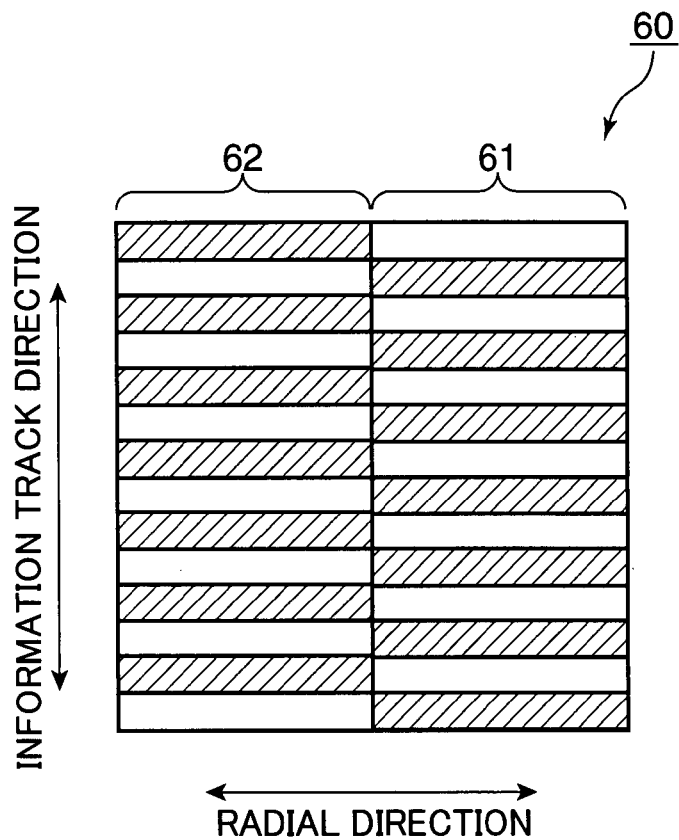
FIG. 13A is a plan view showing periodic structures of grating grooves of a diffraction element according to a prior art 1.
Figure 13B:
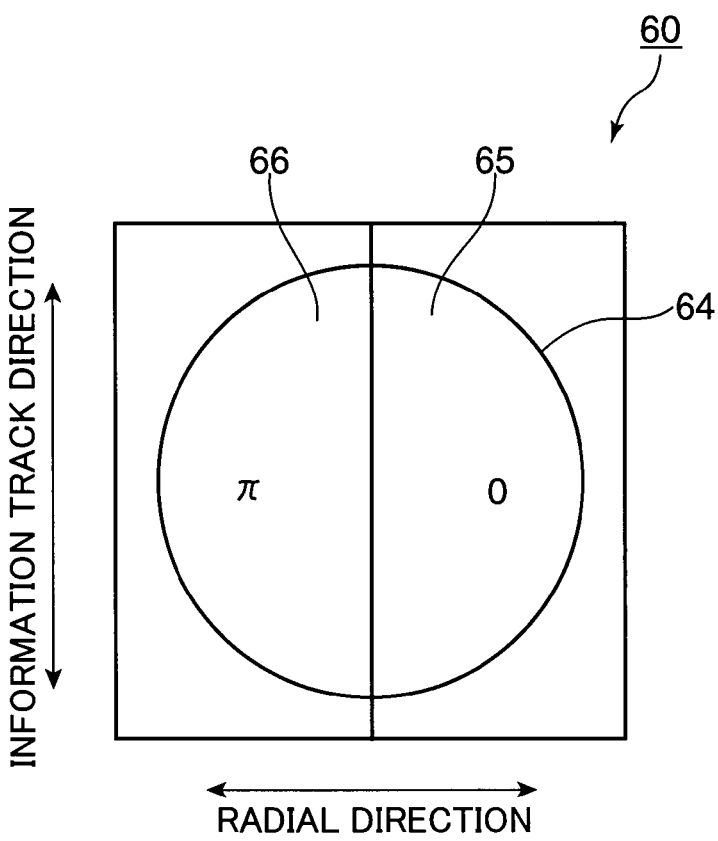
FIG. 13B is a diagram showing a phase distribution of a light beam diffracted by the periodic structures of the diffraction element of FIG. 13A.
Figure 14A:
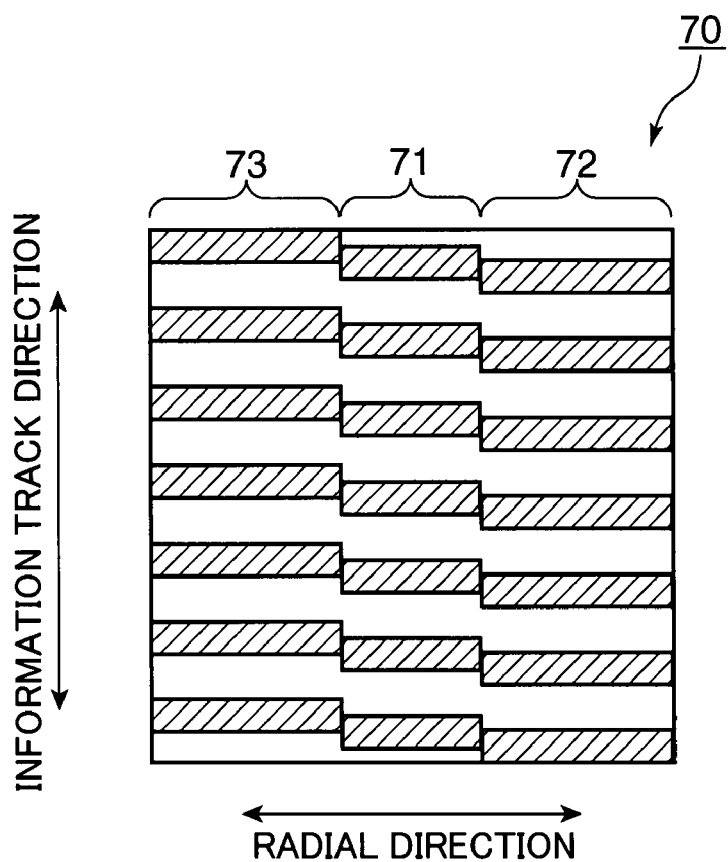
FIG. 14A is a plan view showing periodic structures of grating grooves of a diffraction element according to a prior art 2.
Figure 14B:
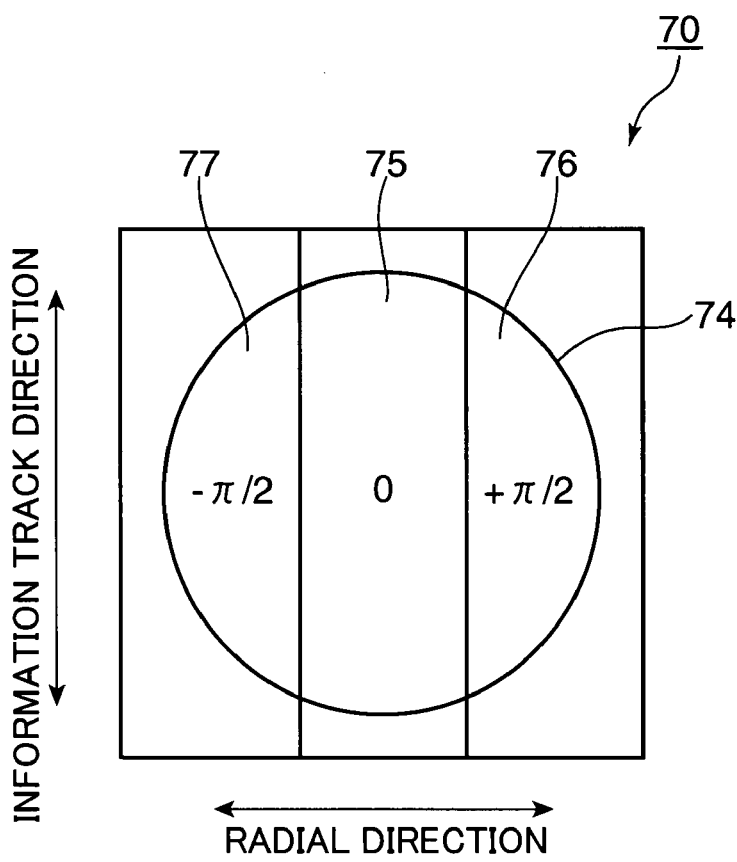
FIG. 14B is a diagram showing a phase distribution of a light beam diffracted by the periodic structures of the diffraction element of FIG. 14A.
Figure 15:
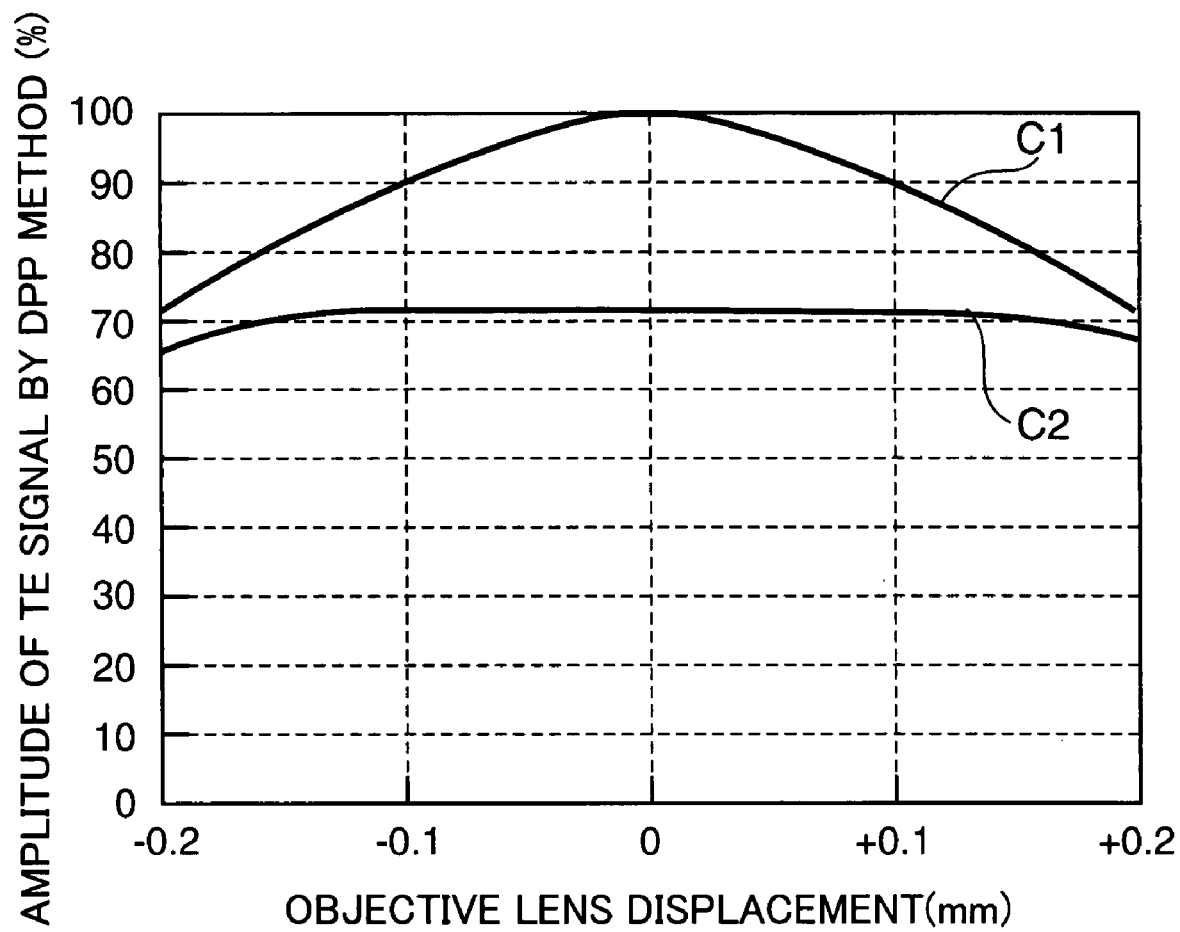
FIG. 15 is a graph showing a change in the amplitude of a TE signal by a DPP method in relation to an objective lens displacement in the case of using optical heads including the diffraction elements according to the prior arts 1 and 2.
Figure 16:
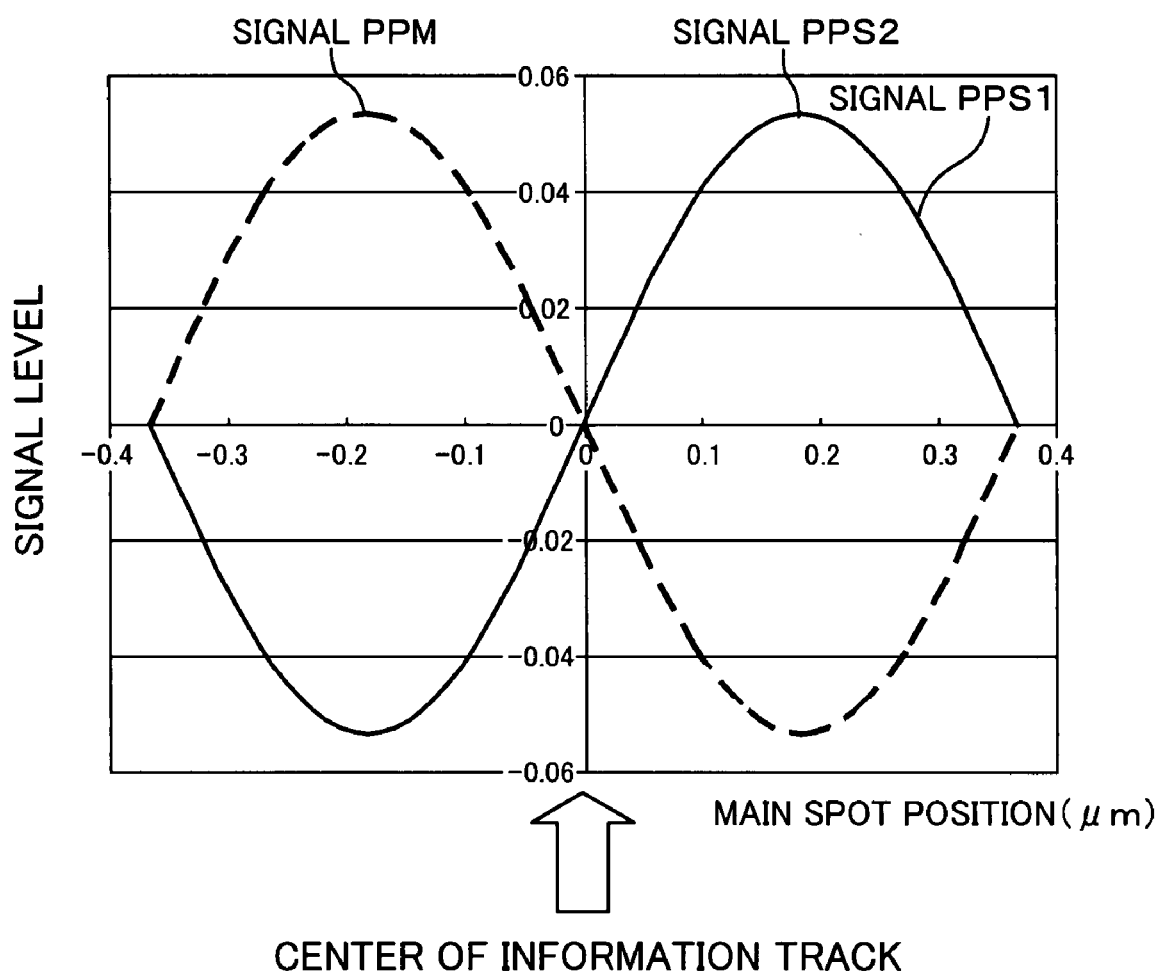
FIG. 16 is a graph showing simulation waveforms of push-pull signals obtained from a main beam and two sub-beams for a conventional DVD-R/RW.
Figure 17:
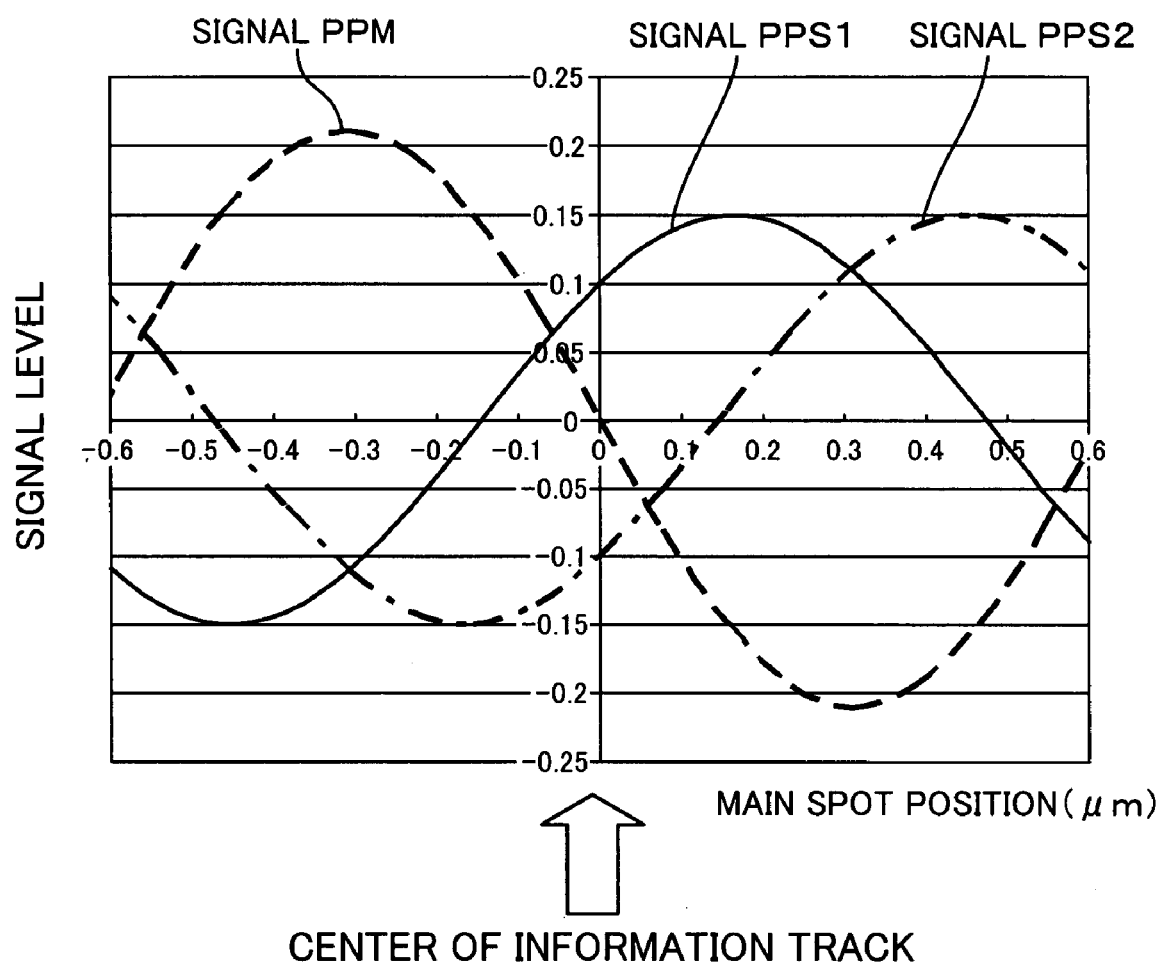
FIG. 17 is a graph showing simulation waveforms of push-pull signals obtained from a main beam and two sub-beams for a conventional DVD-RAM.

FIG. 12 is a functional block diagram showing the schematic construction of an optical disc device according to a fourth embodiment of the present invention. An optical disc device 50 according to the fourth embodiment is provided with an optical head 1, a DVD 17, a spindle motor 51, a traverse motor 52, a signal processor 53 and a controller 54.

The optical head 1 is the optical head 1 according to the first or second embodiment as shown in FIG. 1. The spindle motor 51 rotates the DVD 17 at a specified rotating speed or specified linear speed in accordance with a rotation control signal fed from the controller 54. The traverse motor 52 moves the optical head 1 to a specified position in the radial direction of the DVD 17 in accordance with a movement control signal fed from the controller 54.

The signal processor 53 modulates an information signal fed from the outside to the optical head 1 after modulating it; demodulates the information signal upon receiving an electrical signal corresponding to the light amount of the main beam detected by the optical head 1; generates a tracking error signal TE by the differential push-pull (DPP) method from electrical signals corresponding to the light amounts of the main beam and two sub-beams detected by the three four-divided photodetectors of the optical head 1; and feeds the generated signal to the controller 54.

The controller 54 controls the driving of the spindle motor 51 and traverse motor 52, generates a tracking servo signal TS based on the tracking error signal TE by the DPP method received from the signal processor 53 to perform a tracking servo for the DVD 17 by controlling the driving of the actuator 16 (see FIG. 1) for the objective lens 15 of the optical head 1.

As described above, according to the fourth embodiment, a highly accurate tracking servo can be realized since the quality of the tracking error signal TE by the DPP method can be improved by using the optical head 1 according to the first or second embodiment.

Although the optical disc device 50 according to the fourth embodiment may be provided with an optical head 140 according to the third embodiment.

The optical head capable of interchangeable reproduction from DVD-RAMS and DVD-R/RWs is taken as an example in the fourth embodiment. However, the present invention is not limited thereto and is also applicable to optical heads for interchangeable reproduction from CDs using infrared laser beams in a wavelength range of 780 nm to 820 nm for the recording and reproduction of information signals and DVDs, optical heads corresponding to BDs (Blu-ray Discs) using blue laser beams in a wavelength range of 390 nm to 415 nm for the recording and reproduction of information signals, optical heads for interchangeable reproduction from three types of optical discs, i.e. CDs, DVDs and BDs and optical disc devices equipped with such optical heads.

Although the second area located in the middle of the diffraction element 12 or 120 is divided into two areas as the fourth and fifth areas in the above first and second embodiments, the fourth and fifth areas may be further symmetrically divided into a plurality of areas with respect to a center point of a range where the two sub-beams transmit, and periodic structures in the areas symmetrical with respect to the center point may have grating patterns displaced from each other by a ½ period.

According to this construction, since each sub-beam becomes a luminous flux having such a phase distribution that a phase difference of lights in the areas symmetrical with respect to a beam center point is π radian, the push-pull signals PPS1, PPS2 corresponding to the respective two sub-beams can be signals that zero-cross in the center of the information track independently of the groove pitch similar to the above first or second embodiment.

The specific embodiments described above mainly embrace inventions having the following constructions.

An optical head according to one aspect of the present invention comprises a light source for emitting a light; a diffraction element for splitting the light emitted from the light source into a main luminous flux that is not diffracted and a pair of auxiliary luminous fluxes that are diffracted and polarized; and an objective lens for focusing the main luminous flux and the pair of auxiliary luminous fluxes on an optical disc, wherein the diffraction element is divided in a direction corresponding to a radial direction of the optical disc into a first area, a second area adjacent to the first area and a third area adjacent to the second area; the second area is further divided into a fourth area and a fifth area adjacent to the fourth area; each divided area has a grating pattern of a periodic structure; the periodic structure of the first area is displaced from that of the fourth area by a ¼ period; the periodic structure of the third area is displaced from that of the first area by a ½ period; and the periodic structure of the fifth area is displaced from that of the third area by a ¼ period and from that of the fourth area by a ½ period.

According to this construction, by transmitting the diffraction element, one of the pair of auxiliary luminous fluxes is converted into a wavefront whose phase is displaced from the fourth area by $-\pi/2$ radian in the first area, by $+\pi/2$ radian in the third area and by $+\pi$ radian in the fifth area, and the other thereof is converted into a wavefront whose phase is displaced from the fourth area by $+\pi/2$ radian in the first area, by $-\pi/2$ radian in the third area and by $-\pi$ radian in the fifth area.

Thus, for optical discs having different groove pitches, a tracking error (TE) signal by a differential push-pull (DPP) method can be generated while three light spots formed by the main luminous flux and the pair of auxiliary luminous fluxes are arranged on the same track, and a reduction in the amplitude of the tracking error signal in relation to a displacement of the objective lens can be suppressed. Further, by displacing the phases of the fourth and fifth areas by π, the push-pull signals corresponding to the respective auxiliary luminous fluxes become signals that zero-cross in the center of an information track. Accordingly, even if light amounts of the pair of auxiliary luminous fluxes are not balanced, the TE signal by the DPP method also becomes a signal that zero-crosses in the track center, wherefore the quality of the TE signal can be improved.

In the above optical head, the fourth and fifth areas are preferably divided in a direction corresponding to the radial direction of the optical disc.

According to this construction, the diffraction element converts each of the pair of auxiliary luminous fluxes into a wavefront having four phases, i.e. $-\pi/2$ radian by the first area, zero by the fourth area, $+\pi$ radian by the fifth area and $+\pi/2$ radian by the third area in the radial direction with the auxiliary luminous fluxes being in an opposite phase relationship. It should be noted that the opposite phase relationship means that the signs (±) of the phases of one auxiliary luminous flux and those (±) of the phases of the other auxiliary luminous flux are opposite to each other.

Further, in the above optical head, the fourth and fifth areas are preferably divided in a direction corresponding to an information track direction of the optical disc.

According to this construction, the diffraction element converts each of the pair of auxiliary luminous fluxes into a wavefront having two phases, i.e. zero by the fourth area and π radian by the fifth area in the information track direction.

Further, in the above optical head, it is preferable that the fourth and fifth areas are divided such that the pair of auxiliary luminous fluxes are symmetrical with respect to a center point of a range where they transmit; and that both fourth and fifth areas are so divided as to abut on both first and third areas.

According to this construction, a desired phase distribution can be equally given to the pair of auxiliary luminous fluxes independently of a distance between the light source and the diffraction element since both fourth and fifth areas are so divided as to abut on both first and third areas.

Further, in the above optical head, it is preferable that the fourth and fifth areas are further divided with respect to a center point of a range where they transmit; and that periodic structures of the areas symmetrical with respect to the center point are displaced from each other by a ½ period.

According to this construction, the diffraction element converts each of the pair of auxiliary luminous fluxes into a wavefront having an even number of phases so that a phase difference between the lights in the areas symmetrical with respect to a center point of the luminous flux is π radian for the fourth and fifth areas each further divided into a plurality of areas.

Further, in the above optical head, it is preferable that the fourth area is divided into a sixth area and a seventh area adjacent to the sixth area; that the fifth area is divided into an eighth area and a ninth area adjacent to the eighth area; that the periodic structure of the sixth area is displaced from that of the seventh area by a ½ period; that the periodic structure of the eighth area is displaced from that of the ninth area by a ½ period; and that the periodic structures of the sixth area and ninth areas are equal.

According to this construction, the asymmetry of the sixth and seventh areas and that of the eighth and ninth areas can be canceled out, utilizing the symmetry of the fourth and fifth areas.

An optical disc device according to another aspect of the present invention is for recording and/or reproducing an information signal in and/or from an optical disc, and comprises a spindle motor for rotating the optical disc; an optical head according to the present invention including a light receiving element for receiving the main luminous flux and the pair of auxiliary luminous fluxes reflected by the optical disc and having transmitted the objective lens with a light receiving surface divided into a plurality of light detection areas and converting the respective luminous fluxes into electrical signals corresponding to light amounts of the respective luminous fluxes, and an actuator for driving the objective lens at least in a radial direction relative to the optical disc; a signal processor for generating a tracking error signal by a differential push-pull method from the electrical signals received from the light receiving element of the optical head; and a controller for controlling the driving of the spindle motor and performing a tracking servo for the optical disc by controlling the driving of the actuator of the optical head in accordance with the tracking error signal received from the signal processor.

According to this construction, the quality of the TE signal by the DPP method can be improved by using the above optical head, therefore being able to provide an optical disc device in which a highly accurate tracking servo can be realized.

According to the present invention, a reduction in the amplitude of the TE signal by the DPP method in relation to a displacement of the objective lens can be suppressed without adjusting the positions of the pair of auxiliary luminous fluxes by rotating the diffraction element about an optical axis in order to conform radial distances between the main luminous flux and the pair of auxiliary luminous fluxes to half the groove pitch for optical discs having different groove pitches, and there can be provided an optical head comprising the diffraction element capable of improving the quality of the TE signal by the DPP method even if the light amounts of the pair of auxiliary luminous fluxes are not balanced. Further, by mounting such an optical head, there can be provided an optical disc device in which a highly accurate tracking servo can be realized.

The optical head according to the present invention comprises the diffraction element capable of suppressing the reduction in the amplitude of the TE signal by the DPP method in relation to the displacement of the objective lens without adjusting the positions of two sub-spots by rotating the diffraction element about the optical axis in order to conform radial distances between a main spot and the two sub-spots to half the groove pitch for optical discs having different groove pitches, and improving the quality of the TE signal by the DPP method even if the light amounts of the two sub-beams are not balanced. This is useful in realizing a highly accurate tracking servo upon applying such an optical head to an optical disc device or the like.

This application is based on patent application No. 2006-243361 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An optical head, comprising:
a light source for emitting a light;
a diffraction element for splitting the light emitted from the light source into a main luminous flux that is not diffracted and a pair of auxiliary luminous fluxes that are diffracted and polarized; and
an objective lens for focusing the main luminous flux and the pair of auxiliary luminous fluxes on an optical disc,
wherein the diffraction element is divided in a direction corresponding to a radial direction of the optical disc into a first area, a second area adjacent to the first area and a third area adjacent to the second area;
wherein the second area is further divided into a fourth area and a fifth area adjacent to the fourth area;
wherein each divided area has a grating pattern of a periodic structure;
wherein the periodic structure of the first area is displaced from that of the fourth area by a ¼ period, the periodic structure of the third area is displaced from that of the first area by a ½ period, and the periodic structure of the fifth area is displaced from that of the third area by a ¼ period and from that of the fourth area by a ½ period;
wherein light diffracted by each of the first area, the third area, the fourth area and the fifth area has a different phase;
wherein the phase of the light diffracted by the first area is shifted from the phase of the light diffracted by the fourth area by −π/2 radian, the phase of the light diffracted by the third area is shifted from the phase of the light diffracted by the fourth area by +π/2 radian, and the phase of the light diffracted by the fifth area is shifted from the phase of the light diffracted by the fourth area by π radian;
wherein the diffraction element transmits the main luminous flux without application of a phase distribution; and
wherein the pair of auxiliary luminous fluxes have phases opposite to each other, and are converted into a wavefront having a four-stage phase distribution including −π/2 radian by the first area, 0 radian by the fourth area, π radian by the fifth area, and +π/2 radian by the third area in the radial direction of the optical disc.

2. An optical head according to claim 1, wherein the fourth and fifth areas are divided in a direction corresponding to the radial direction of the optical disc.

3. An optical head according to claim 1, wherein the fourth and fifth areas are divided in a direction corresponding to an information track direction of the optical disc.

4. An optical head according to claim 2, wherein the fourth and fifth areas are divided such that the pair of auxiliary luminous fluxes are symmetrical with respect to a center point of a range where they transmit, and the fourth and fifth areas are divided such that the fourth area abuts on both the first and third areas and the fifth area abuts on both the first and third areas.

5. An optical head according to claim 2, wherein the fourth and fifth areas are further divided with respect to a center point of a range where they transmit, and periodic structures of the areas symmetrical with respect to the center point are displaced from each other by a ½ period.

6. An optical head according to claim 1, wherein the fourth area is divided into a sixth area and a seventh area adjacent to the sixth area;
wherein the fifth area is divided into an eighth area and a ninth area adjacent to the eighth area;
wherein the periodic structure of the sixth area is displaced from that of the seventh area by a ½ period; and
wherein the periodic structure of the eighth area is displaced from that of the ninth area by a ½ period; and the periodic structures of the sixth and ninth areas are equal.

7. An optical disc device for recording and/or reproducing an information signal in and/or from an optical disc, the optical disc device comprising:
a spindle motor for rotating the optical disc;
an optical head according to claim 1 including a light receiving element for receiving the main luminous flux and the pair of auxiliary luminous fluxes reflected by the optical disc and having transmitted the objective lens with a light receiving surface divided into a plurality of light detection areas and converting the respective luminous fluxes into electrical signals corresponding to light amounts of the respective luminous fluxes, and an actuator for driving the objective lens at least in a radial direction relative to the optical disc;
a signal processor for generating a tracking error signal by a differential push-pull method from the electrical signals received from the light receiving element of the optical head; and
a controller for controlling the driving of the spindle motor and performing a tracking servo for the optical disc by controlling the driving of the actuator of the optical head in accordance with the tracking error signal received from the signal processor.

* * * * *